US012508506B2

(12) United States Patent
Kanahara et al.

(10) Patent No.: US 12,508,506 B2
(45) Date of Patent: Dec. 30, 2025

(54) CONTROL SYSTEM, INFORMATION SYSTEM, INFORMATION PROCESSING METHOD, AND COMPUTER-READABLE RECORDING MEDIUM

(71) Applicant: Konami Digital Entertainment Co., Ltd., Tokyo (JP)

(72) Inventors: Toshiaki Kanahara, Tokyo (JP); Shigeru Chiba, Tokyo (JP); Tsuguo Shinpo, Tokyo (JP); Kai Inoue, Tokyo (JP); Junki Hirai, Tokyo (JP); Akira Sakai, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 280 days.

(21) Appl. No.: 18/311,293

(22) Filed: May 3, 2023

(65) Prior Publication Data

US 2023/0271086 A1 Aug. 31, 2023

Related U.S. Application Data

(63) Continuation of application No. PCT/JP2021/045331, filed on Dec. 9, 2021.

(30) Foreign Application Priority Data

Dec. 25, 2020 (JP) ................................. 2020-217910

(51) Int. Cl.
*A63F 13/537* (2014.01)
*A63F 13/86* (2014.01)
*A63F 13/812* (2014.01)

(52) U.S. Cl.
CPC ............ *A63F 13/537* (2014.09); *A63F 13/86* (2014.09); *A63F 13/812* (2014.09)

(58) Field of Classification Search
None
See application file for complete search history.

(56) References Cited

U.S. PATENT DOCUMENTS

2006/0281547 A1* 12/2006 Sogabe .................. A63F 13/54 463/35
2009/0131177 A1 5/2009 Pearce
(Continued)

FOREIGN PATENT DOCUMENTS

CN 101981589 A 2/2011
CN 105468607 A 4/2016
(Continued)

OTHER PUBLICATIONS

International Search Report dated Feb. 22, 2022 in Application No. PCT/JP2021/045331.
(Continued)

*Primary Examiner* — Damon J Pierce
(74) *Attorney, Agent, or Firm* — Sughrue Mion, PLLC

(57) ABSTRACT

A control system includes: one or more memories configured to store instructions; and one or more processors communicatively connected to the one or more memories and configured to execute the instructions to: acquire status data indicative of a status of a game from a game system configured to progress the game played by one or more players; generate commentary information to be played by a terminal apparatus to which a game video representative of the status of the game is delivered, the commentary information being to be played in conjunction with the game video; and use the status data and setting data specifying a commentary condition to generate the commentary information on the status of the game under the commentary condition.

11 Claims, 18 Drawing Sheets

| x3 | r1 | r2a | r2b | r3 |
|---|---|---|---|---|
| START OF MATCH | PLAY BALL! | P | P | — |
| HIT | [Q1] GOT A HIT! | NP | NP | — |
| DOUBLE | [q1] GOT A DOUBLE! | P | P | — |
| TRIPLE | [q1] GOT A TRIPLE! | P | P | — |
| HOME RUN | [q1] GOT A HOME RUN BY USING [x5]! | P | P | — |
| | [x6] WAS HIT EXCELLENTLY! | P | P | — |
| | [q1] GOT [q22+x7]TH HOME RUN IN THIS SEASON! | P | P | q22+x7=10n |
| PICKOFF ATTEMPT | [q1] IS WARY OF THE RUNNER. | NP | NP | — |
| GRABBING STRIKEOUT | [q1] GOT [x7]TH STRIKEOUT! | P | P | x7 > 2 |
| SCORE | [q1] ADDS AN INSURANCE RUN! | P | P | x7 > 4 |
| | [q1] CLOSED THE GAP TO [X7] POINTS! | P | P | x7 < 1 |
| | [q1] TIED THE SCORE HERE! | P | P | x7 = 1 |
| ⋮ | ⋮ | ⋮ | ⋮ | ⋮ |

[ ]: VARIABLE PORTION P: PERMISSION NP: NO PERMISSION

(56) References Cited

U.S. PATENT DOCUMENTS

| | | | | |
|---|---|---|---|---|
| 2017/0003740 A1* | 1/2017 | Verfaillie | ................ | A63F 13/87 |
| 2019/0118098 A1* | 4/2019 | Payzer | .................... | A63F 13/77 |

FOREIGN PATENT DOCUMENTS

| | | | |
|---|---|---|---|
| CN | 110990550 | A | 4/2020 |
| JP | 2002-239225 | A | 8/2002 |
| JP | 2006-230582 | A | 9/2006 |
| JP | 2008-289776 | A | 12/2008 |
| JP | 2010-57692 | A | 3/2010 |
| JP | 2013-17692 | A | 1/2013 |
| JP | 2013-165910 | A | 8/2013 |
| JP | 5497233 | B1 | 5/2014 |
| JP | 2016-189803 | A | 11/2016 |
| JP | 6098691 | B1 | 3/2017 |
| JP | 2018-11850 | A | 1/2018 |
| JP | 2018-114185 | A | 7/2018 |
| JP | 2018-520772 | A | 8/2018 |
| JP | 2019-205645 | A | 12/2019 |
| TW | 201442770 | A | 11/2014 |
| WO | 03/019965 | A1 | 3/2003 |

OTHER PUBLICATIONS

Written Opinion of the International Searching Authority dated Feb. 22, 2022 in Application No. PCT/JP2021/045331.
Notice of Reasons for Refusal dated May 2, 2023 from the Japanese Patent Office in Application No. 2020-217910.
Office Action dated Jun. 30, 2023 from the Taiwanese Patent Office in Application No. 109145373.
International Search Report dated Feb. 22, 2021 from the International Searching Authority in International Application No. PCT/JP2020/045705.
Written Opinion dated Feb. 22, 2021 from the International Searching Authority in International Application No. PCT/JP2020/045705.
Japanese Office Action issued Jan. 23, 2024 in Application No. 2019-237698.
Japanese Office Action issued Jan. 23, 2024 in Application No. 2019-237699.
Extended European Search Report issued Feb. 9, 2024 in Application No. 21910352.0.
Office Action issued Oct. 3, 2023 in Japanese Application No. 2019-237698.
Office Action issued Oct. 3, 2023 in Japanese Application No. 2019-237699.
Decision of Refusal issued Jun. 4, 2024 in Japanese Application No. 2019-237698.
Decision of Dismissal of Amendment issued Jun. 4, 2024 in Japanese Application No. 2019-237698.
Decision of Refusal issued Jun. 4, 2024 in Japanese Application No. 2019-237699.
Decision of Dismissal of Amendment issued Jun. 4, 2024 in Japanese Application No. 2019-237699.
Office Action issued Jun. 12, 2024 in Korean Application No. 10-2022-7024273.
Office Action issued Jul. 5, 2024 in Taiwanese Application No. 112138914.
Communication dated Nov. 28, 2024 in European Application No. 21 910 352.0.
Communication dated Dec. 4, 2024 in U.S. Appl. No. 17/847,751.
Communication dated Dec. 3, 2024 in Japanese Application No. 2023-160090.
Communication dated Dec. 19, 2024 in Korean Application No. 10-2023-7014904.
Office Action issued Feb. 20, 2025 in Chinese Patent Application No. 202080089728.X.
Office Action issued Feb. 24, 2025 in Korean Patent Application No. 10-2022-7024273.
Final Office Action dated Feb. 27, 2025 issued in U.S. Appl. No. 17/847,751.
Communication issued May 7, 2025 in Japanese Application No. 2023-160090.
Communication issued May 15, 2025 in European Application No. 21910352.0.
Communication issued Apr. 29, 2022 in Taiwanese Application No. 109145373.
Communication issued May 9, 2025 in U.S. Appl. No. 17/847,751.
Communication dated Jun. 6, 2025 from the United States Patent and Trademark Office in U.S. Appl. No. 17/847,751.
Screenshot of YouTube image, "WRC eSports World Finals 2019. Season 4 Live Show", Oct. 5, 2019, https://www.google.com/search?q=live+esports+play-by-play-F2019+live&safe=active&sca_esv=a89d269aec3ce157&rlz=101GCEA_enUS1106US1106&sxsrf=AE3TifPceHMI 4xqFNCWHYg0e82ZBSH16IQ%3A1749007357529&ei =_ Ips_aLaAIP_15NoP2e_GyQ8&oq=live+esports, (15 pages total).
Office Action dated Sep. 23, 2022 issued by the Taiwanese Patent Office in Taiwanese Application No. 109145373.
Manmosu Maruyama, "Presents culmination and the new version of the current 'Sengoku Taisen' !, Sengoku Taisen Official National Tournament, Report on 'The Road to Tenha 2015 national finals' ", Famitsu.com, Kadokawa Game Linkage Inc., Dec. 21, 2015, pp. 1-9 (9 pages total).
Communication issued Sep. 20, 2025 in Chinese Application No. 202180086982.9.

* cited by examiner

FIG. 5

| | x1 | x2 | x3 | x4 | x5 | x6 | x7 |
|---|---|---|---|---|---|---|---|
| X[1] | 0001 | 03:10 | START OF MATCH | Pa/Pb | — | — | — |
| | --- | --- | --- | --- | --- | --- | --- |
| X[2] | 0021 | 05:10 | STRIKEOUT | Pa | CHARACTER a1 | LOW INSIDE: FORKBALL | — |
| X[3] | 0023 | 07:00 | DOUBLE | Pa | CHARACTER a4 | LOW INSIDE: FASTBALL | — |
| X[4] | 0024 | 07:35 | BASE STEALING | Pa | CHARACTER a4 | — | — |
| X[5] | 0025 | 09:30 | HOME RUN | Pa | CHARACTER a6 | LOW OUTSIDE: CURVE | HOME RUNS:1 |
| X[6] | 0026 | 09:30 | SCORE | Pa | CHARACTER a6 | — | SCORE GAP: -2 |
| | --- | --- | --- | --- | --- | --- | --- |
| X[7] | 0022 | 05:10 | GRABBING STRIKEOUT | Pb | CHARACTER b1 | LOW INSIDE: FORKBALL | STRIKEOUTS:3 |
| | --- | --- | --- | --- | --- | --- | --- |

FIG. 8

Q

| | PLAYER Pa | PLAYER Pb |
|---|---|---|
| PLAYER NAME q1 | AAA | BBB |
| TOTAL WINS AND TOTAL LOSSES q21 | 13 WINS, 10 LOSSES, AND 01 DRAW | 15 WINS, 09 LOSSES, AND 00 DRAW |
| TOTAL HOME RUNS q22 | 29 | 25 |
| TOTAL STRIKEOUTS q23 | 170 | 190 |

q2

FIG. 9

| x3 | r1 | r2a | r2b | r3 |
|---|---|---|---|---|
| START OF MATCH | PLAY BALL! | P | P | — |
| HIT | [Q1] GOT A HIT! | NP | NP | — |
| DOUBLE | [q1] GOT A DOUBLE! | P | P | — |
| TRIPLE | [q1] GOT A TRIPLE! | P | P | — |
| HOME RUN | [q1] GOT A HOME RUN BY USING [x5]! | P | P | — |
| | [x6] WAS HIT EXCELLENTLY! | P | P | — |
| | [q1] GOT [q22 + x7]TH HOME RUN IN THIS SEASON! | P | P | $q22 + x7 = 10n$ |
| PICKOFF ATTEMPT | [q1] IS WARY OF THE RUNNER. | NP | NP | — |
| GRABBING STRIKEOUT | [q1] GOT [x7]TH STRIKEOUT! | P | P | $x7 > 2$ |
| SCORE | [q1] ADDS AN INSURANCE RUN! | P | P | $x7 > 4$ |
| | [q1] CLOSED THE GAP TO [X7] POINTS! | P | P | $x7 < 1$ |
| | [q1] TIED THE SCORE HERE! | P | P | $x7 = 1$ |
| ⋮ | ⋮ | ⋮ | ⋮ | ⋮ |

[ ]: VARIABLE PORTION P: PERMISSION NP: NO PERMISSION

FIG. 14

FIRST REFERENCE DATA Ra
[PLAYER Pa]

| | |
|---|---|
| r1 | r3 |
| r1 | r3 |
| ... | |

SECOND REFERENCE DATA Rb
[PLAYER Pb]

| | |
|---|---|
| r1 | r3 |
| r1 | r3 |
| ... | |

CONTROL SYSTEM, INFORMATION SYSTEM, INFORMATION PROCESSING METHOD, AND COMPUTER-READABLE RECORDING MEDIUM

CROSS REFERENCE TO RELATED APPLICATIONS

This application is a Continuation Application of PCT Application No. PCT/JP2021/045331, filed on Dec. 9, 2021, and is based on, and claims priority from, Japanese Patent Application No. 2020-217910, filed on Dec. 25, 2020, the entire contents of each of which are incorporated herein by reference.

BACKGROUND

Field of the Invention

The present disclosure relates to games.

Description of Related Art

As the spread of events (e-sports) in which a plurality of players compete in various games, etc., various techniques are proposed for delivering a video (hereinafter referred to as a "game video") representative of the status of a game (for example, as in Japanese Patent Application Laid-Open Publication 2016-189803). Text for a commentary on the status of the game is added to the game video. However, in order to add text for a commentary to a game video, the provider of the game video must manually enter the text in parallel with the progress of the game, resulting in having a problem in that a work load is excessive.

SUMMARY

In view of the circumstances described above, an object of the present disclosure is to reduce a load for entering information indicative of a commentary on a game.

In one aspect, a control system includes one or more memories configured to store instructions, and one or more processors communicatively connected to the one or more memories. The one or more processors are configured to execute the instructions to: acquire status data indicative of a status of a game from a game system configured to progress the game played by one or more players; generate commentary information to be played by a terminal apparatus to which a game video representative of the status of the game is delivered, the commentary information being to be played in conjunction with the game video; and use the status data and setting data specifying a commentary condition to generate the commentary information on the status of the game under the commentary condition.

In another aspect, an information system includes: a game system configured to progress a game played by one or more players; and a control system configured to communicate with the game system. The control system includes one or more memories configured to store instructions, and one or more processors communicatively connected to the one or more memories. The one or more processors are configured to execute the instructions to: acquire status data indicative of a status of the game from the game system; generate commentary information to be played by a terminal apparatus to which a game video representative of the status of the game is delivered, the commentary information being to be played in conjunction with the game video; and use the status data and setting data specifying a commentary condition to generate the commentary information on the status of the game under the commentary condition.

In yet another aspect, an information processing method includes: acquiring status data indicative of a status of a game from a game system configured to progress the game played by one or more players; and generating commentary information to be played by a terminal apparatus to which a game video representative of the status of the game is delivered, the commentary information being to be played in conjunction with the game video, in which the generating of the commentary information includes using the status data and setting data specifying a commentary condition to generate the commentary information on the status of the game under the commentary condition.

In yet another aspect, a non-transitory computer-readable recording medium storing a program executable by a computer system. The computer system is configured to execute the program to: acquire status data indicative of a status of a game from a game system configured to progress the game played by one or more players; generate commentary information to be played by a terminal apparatus to which a game video representative of the status of the game is delivered, the commentary information being to be played in conjunction with the game video; and use the status data and setting data specifying a commentary condition to generate the commentary information on the status of the game under the commentary condition.

BRIEF DESCRIPTION OF THE DRAWINGS

FIG. 5 is a schematic diagram of status data X.

FIG. 8 is a schematic diagram of supplementary data.

FIG. 9 is a schematic diagram of reference data.

FIG. 14 is a schematic diagram of setting data in a second embodiment.

DESCRIPTION OF EMBODIMENTS

Embodiments according to the present disclosure will be described with reference to the drawings. The embodiments described below include various technical limitations. The scope of the present disclosure is not limited to the embodiments described below.

First Embodiment

Figure 1:
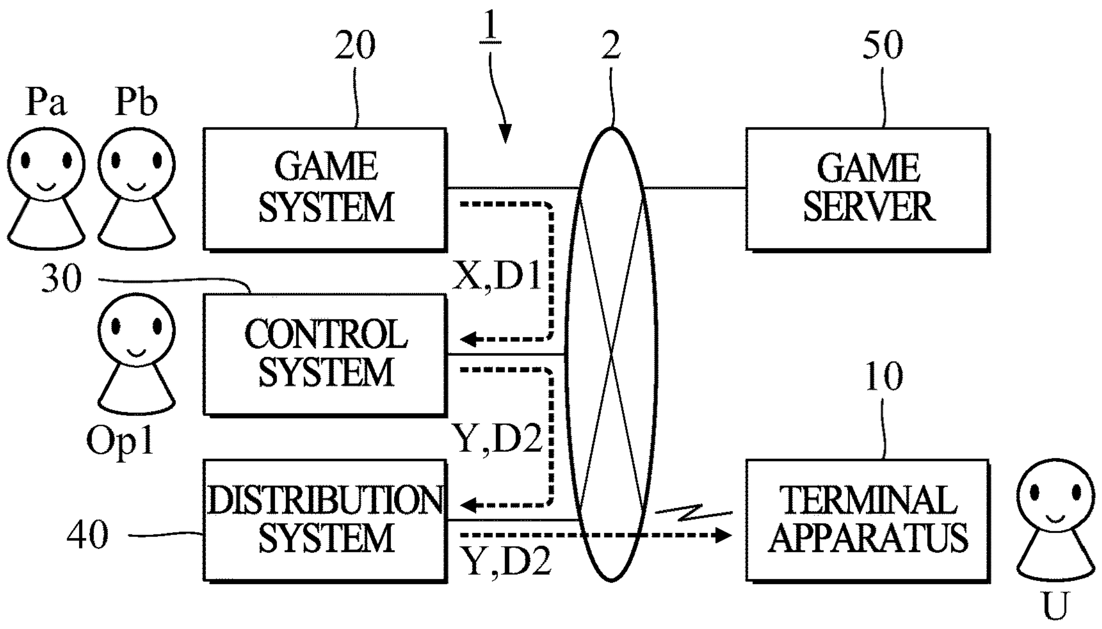
FIG. 1 is a block diagram showing a configuration of an information system according to a first embodiment.

FIG. 1 is a block diagram showing a configuration of an information system 1 according to a first embodiment. The information system 1 is a computer system configured to distribute a video (hereinafter, referred to as a "distributed video") V, which is related to a game played by a player Pa and by a player Pb, to a terminal apparatus 10. For example, in a competition event (e-sports) in which a large number of players participates, the player Pa and the player Pb play against each other in a baseball game. The baseball game is a game in which the team of a player Pa, which consists of a plurality of characters, and the team of a player Pb, which consists of a plurality of characters, play against each other in baseball. The distributed video V, which is content that includes imagery (video and still images) and audio sounds, is delivered in real time to the terminal apparatus 10 in parallel with the progress of the baseball game (i.e., in live streaming). In the following explanation, when it is unnecessary to particularly distinguish the player Pa and the player Pb from each other, each of the players is simply referred to as a "player P."

Figure 2:
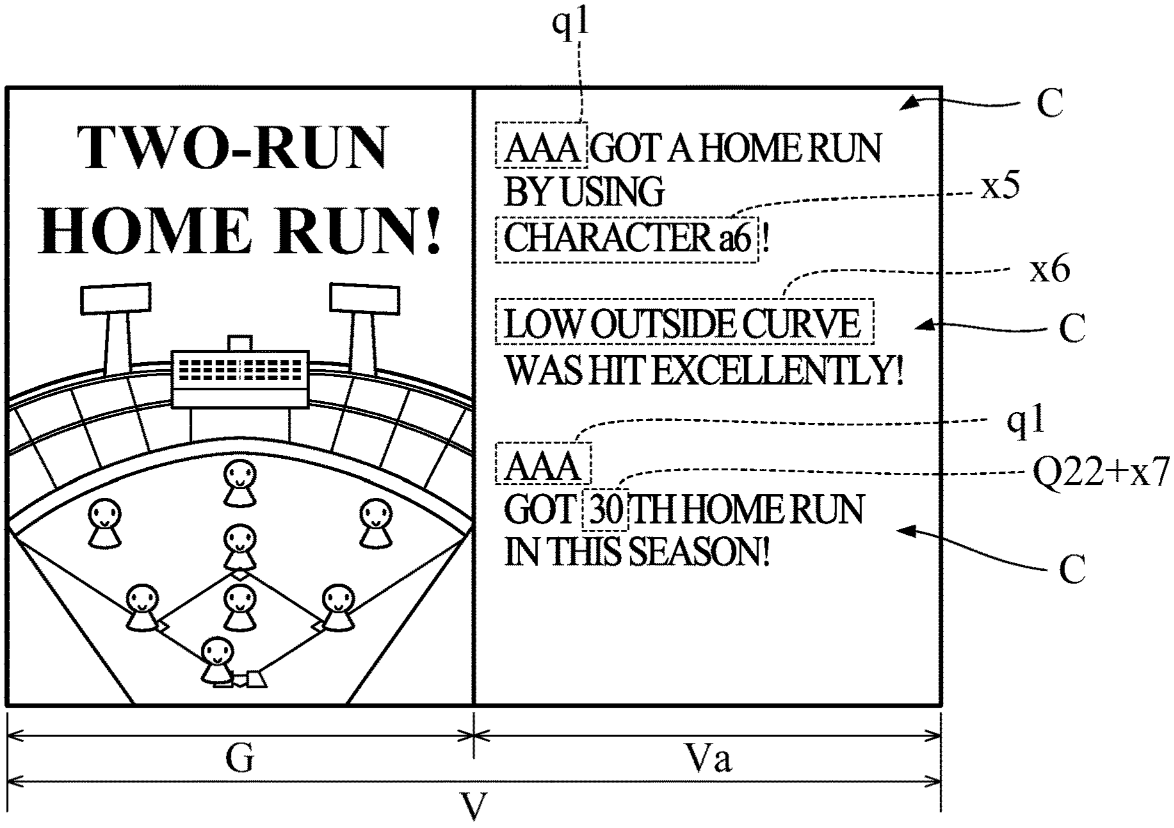
FIG. 2 is a schematic diagram of a distribution image.

FIG. 2 is a schematic diagram showing the distributed video V. As shown in FIG. 2, the distributed video V includes a game video G and commentary text C. The game video G is a video representative of the status of the baseball game in which the player Pa and the player Pb play against each other. One or more pieces of commentary text C are displayed in a commentary area Va adjacent to the game video G in the distributed video V. The commentary text C is text for explaining various states such as occurrence of an event in the baseball game. The commentary text C includes one or more words, one or more sentences, or a combination thereof. The commentary text C includes not only information that can be directly understood from the game video G, but also various information that cannot be understood from the game video G.

The terminal apparatus 10 in FIG. 1 is an apparatus that can play the distributed video V. For example, a portable or stationary type information terminal, such as a mobile phone, a smartphone, a tablet terminal, or a personal computer, may be used as the terminal apparatus 10. Alternatively, a display such as a television receiver may be used as the terminal apparatus 10, for example. The terminal apparatus 10 plays the distributed video V of FIG. 2 delivered from the information system 1. In other words, the commentary text C is displayed together with the game video G. A user U of the terminal apparatus 10 watches, in real time, the distributed video V representative of the status of the baseball game in parallel with the progress of the baseball game. Specifically, the user U understands the progress of the game by watching the game video G of the distributed video V, and the user U can confirm detailed information on the status of the progress by referring to the commentary text C. Actually, the distributed video V is delivered to respective terminal apparatuses 10; however, in the following explanation, the terminal apparatus 10 will be focused on for convenience.

As shown in FIG. 1, the information system 1 includes a game system 20, a control system 30, a distribution system 40, and a game server 50. Each of the elements of the information system 1 is communicable with each other via a communication network 2 such as the Internet. In addition, the distribution system 40 is communicable with the terminal apparatus 10 via the communication network 2.

The game system 20 controls the baseball game. Specifically, the game system 20 not only progresses the baseball game in accordance with operations from each player P, but also transmits status data X and video data D1 to the control system 30. The status data X is data indicative of a current status of the baseball game. The video data D1 is data indicative of a video of the baseball game. The control system 30 not only generates commentary data Y from the status data X, but also generates video data D2 from the video data D1. The commentary data Y is text data indicative of the commentary text C described above. The video data D2 is data indicative of the game video G of the baseball game. The distribution system 40 transmits the commentary data Y and the video data D2 generated by the control system 30 to the terminal apparatus 10. The distributed video V of FIG. 2, which includes the commentary text C indicated by the commentary data Y and the game video G indicated by the video data D2, is displayed by the terminal apparatus 10.

Figure 3:
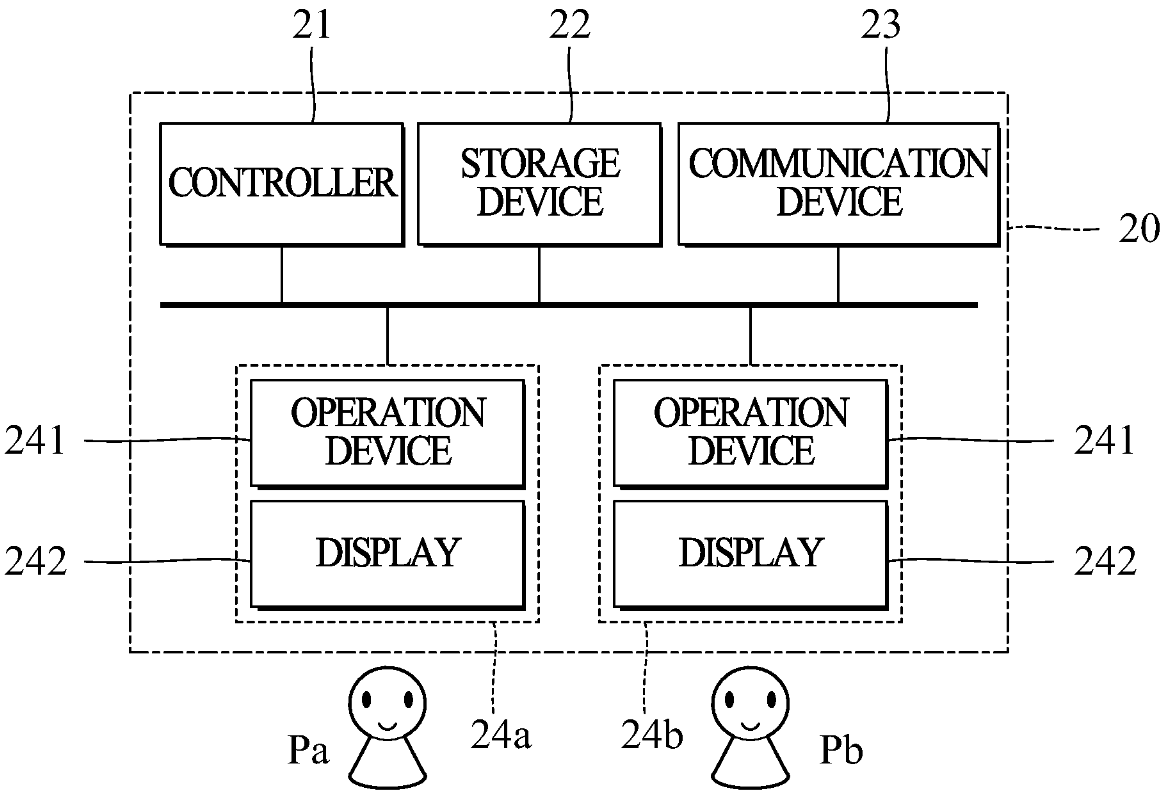
FIG. 3 is a block diagram showing a configuration of a game system.

FIG. 3 is a block diagram showing a configuration of the game system 20. As shown in FIG. 3, the game system 20 is a computer system that includes a controller 21, a storage device 22, a communication device 23, and a plurality of game units 24 (24*a*, 24*b*). The game system 20 is not only achieved as a single device but may be also achieved by a set of a plurality of devices separate from each other.

The controller 21 is constituted by one or more processors configured to control each of the elements of the game system 20, for example. Specifically, the controller 21 is constituted by one or more types of processors such as a central processing unit (CPU), a graphics processing unit (GPU), a digital signal processor (DSP), a field programmable gate array (FPGA), or an application specific integrated circuit (ASIC).

The storage device 22 is one or more memories configured to store a program executed by the controller 21 and various data used by the controller 21. For example, a known recording medium such as a semiconductor recording medium and a magnetic recording medium, or a combination of different types of recording mediums may be used as the storage device 22. The communication device 23 communicates with the control system 30 via the communication network 2.

Each of the game units 24 (24*a*, 24*b*) is a user interface used to play the game by the player P. The player Pa uses the game unit 24*a*, whereas the player Pb uses the game unit 24*b*. In addition to a device dedicated to the baseball game, for example, a general-purpose information terminal, such as a smartphone, a tablet terminal, or a personal computer, may be used as the game unit 24.

Each of the game units 24 includes an operation device 241 and a display 242. The operation device 241 is an input device configured to receive operations made by each player P. The display 242 displays various imagery under the control of the controller 21. For example, the display 242 displays play imagery representative of the status of the game. The play imagery is a video that is visually recognized by each player P during playing of the game. The play imagery displayed by the display 242 of the game unit 24*a* may be the same as, or may be different from, the play imagery displayed by the display 242 of the game unit 24*b*.

Figure 4:
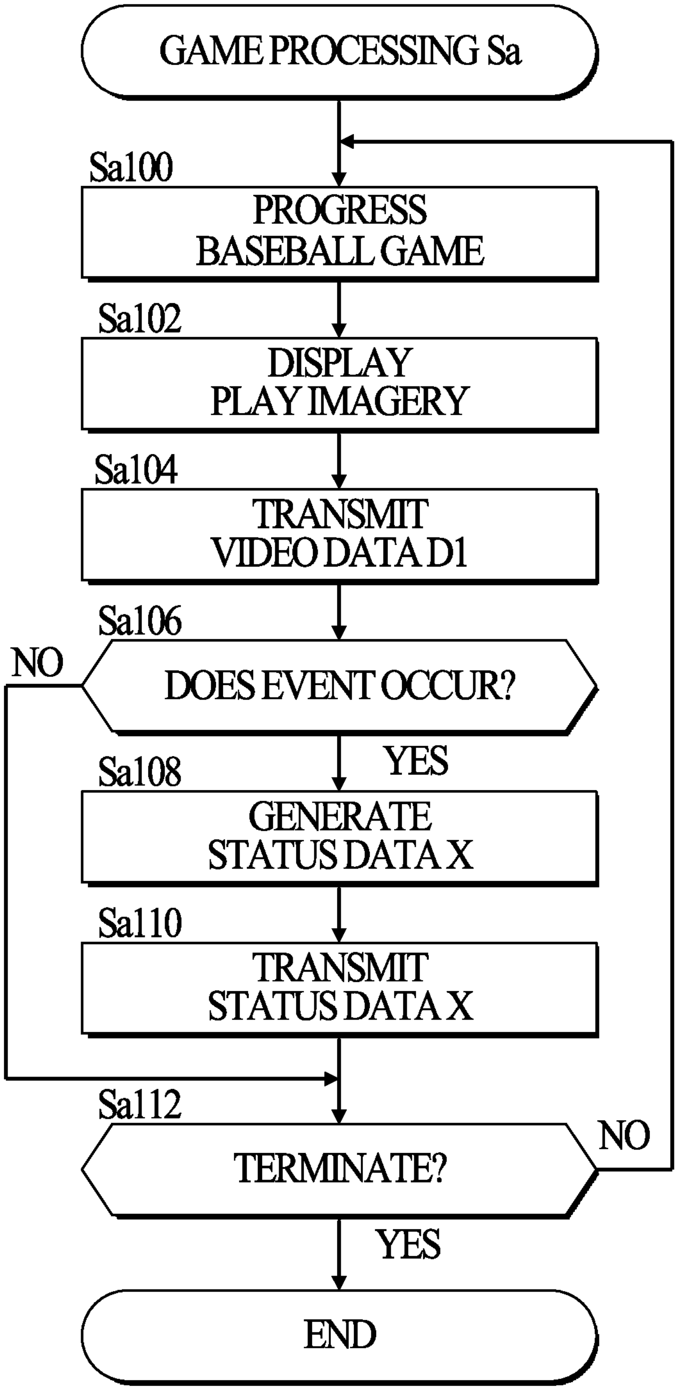
FIG. 4 is a flow chart showing a specific procedure of game processing.

FIG. 4 is a flow chart showing a specific procedure of processing (hereinafter, referred to as "game processing") Sa in which the controller 21 controls the baseball game. For example, the game processing Sa starts in response to an instruction to start the baseball game being entered into the operation device 241.

When the game processing Sa starts, the controller 21 progresses the baseball game in accordance with operations from each of the players P to the operation device 241 (Sa100). The controller 21 causes each of the displays 242 to display the play imagery (Sa102). In addition, the controller 21 generates the video data D1 of a video representative of the current status of the baseball game to transmit the video data D1 from the communication device 23 to the control system 30 (Sa104). The video indicated by the video data D1 is, for example, a video similar to the play imagery displayed by the display 242 in one of the game units 24. Alternatively, the video data D1, which indicates a video generated separately from the play imagery, may be generated.

The controller 21 determines whether an event occurs during the progress of the baseball game (Sa106). The event is among various events generated at respective predetermined timings in accordance with the progress of the baseball game. For example, the event may be a start event of the baseball game, or it may be an end event of the baseball game, etc. As for a team that is at bat in the baseball game, examples of the event may include various events such as "hit," "home run," "base stealing," "score," and "batter change," for example. As for a team that is in the field in the baseball game, examples of the event may include various events such as "grabbing strikeout," "pickoff attempt," "catch a fly," and "pitcher change," for example.

In response to the event occurring (Sa106: YES), the controller 21 generates status data X on the event (Sa108) to transmit the status data X from the communication device 23 to the control system 30 (Sa110). On the other hand, in response to no event occurring (Sa106: NO), neither generation (Sa108) nor transmission (Sa110) of status data X is executed.

The controller 21 determines whether the baseball game terminates (Sa112). In response to the baseball game not terminating (Sa112: NO), the controller 21 returns the processing to step Sa100. As shown above, in the first embodiment, the video data D1 and the status data X are transmitted to the control system 30 in parallel with the progress of the baseball game. Specifically, the video data D1 is transmitted sequentially at predetermined time intervals, whereas the status data X is transmitted each time the event occurs. In response to the baseball game terminating (Sa112: YES), the controller 21 terminates the game processing Sa.

FIG. 5 is a schematic diagram of the status data X corresponding to an event. In FIG. 5, a plurality of pieces of status data X (X[1], X[2], X[3] . . . ) corresponding to different types of events are described. As shown in FIG. 5, the status data X includes identification information x1, occurrence time x2, an event type x3, a target player x4, a target character x5, detailed information x6, and control information x7.

The identification information x1 is a string of codes for identifying an event in a match of the baseball game. The occurrence time x2 is time at which the event occurred. For example, a point in time at which the match of the baseball game started, or a period in time that has elapsed since a point in time at which transmission of the video data D1 was started, is designated as the occurrence time x2. The event type x3 is a type related to the contents of the event. For example, a type such as "start of match," "strikeout," "grabbing strikeout," "hit," "base stealing," "home run," and "score" is designated as the event type x3.

The target player x4 is information indicative of a player P that causes the event. For example, regarding an event particular to an offense such as "strikeout," "hit," "base stealing," "home run," and "score," a player P (player Pa in FIG. 5) of the offense is designated as the target player x4. Regarding an event particular to a defense such as "grabbing strikeout," a player P (player Pb in FIG. 5) of the defense is designated as the target player x4.

The target character x5 is information indicative of a character, which causes the event, among a plurality of characters appearing in the baseball game. For example, regarding an event on the offense such as "strikeout," "hit," and "home run," a batter character of the offense team is designated as the target character x5. Regarding an event on the defense such as "grabbing strikeout," a pitcher character of the defense team is designated as the target character x5.

The detailed information x6 is detailed information on the event. For example, regarding an event such as "strikeout," "grabbing strikeout," "hit", and "home run," a pitch type selected by the player P of the defense at the time of pitching is set as the detailed informational x6. Regarding events not related to pitching such as "base stealing," the detailed information x6 is not set.

The control information x7 is information that specifies a current numerical value for a variable that varies related to the baseball game. For example, the control information x7 specifies the current numerical value for a variable such as "the number of grabbing strikeouts," "the number of home runs," and "score gap." In FIG. 5, "home runs: 1" means that "the number of home runs" of the player Pa has been changed to "1" due to an occurrence of an event of a "home run." In FIG. 5, "strikeouts: 3" means that "the number of strikeouts" grabbed by the player Pb has been changed to "3" due to an occurrence of an event of "grabbing strikeout." In addition, "score gap: −2" means that the "score gap" between the player Pa and the player Pb has been changed to "−2" an occurrence of an event of "score."

As will be understood from the above description, the status data X indicates an event that occurs in the baseball game. As described above, each time an event occurs during the progress of the baseball game, the status data X is transmitted from the game system 20 to the control system 30. The format or the contents of the status data X is not limited to the example of FIG. 5.

Figure 6:
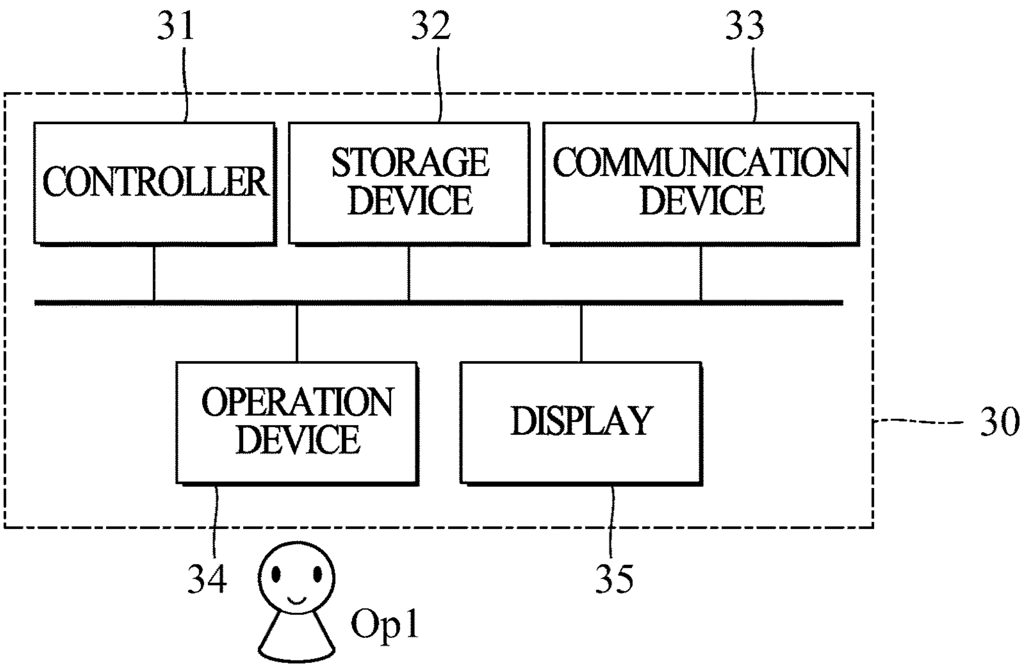
FIG. 6 is a block diagram showing a configuration of a control system.

FIG. 6 is a block diagram showing a configuration of the control system 30. As shown in FIG. 6, the control system 30 is a computer system that includes a controller 31, a storage device 32, a communication device 33, an operation device 34, and a display 35. For example, a portable or stationary information terminal, such as a mobile phone, a smartphone, a tablet terminal, or a personal computer, may be used as the control system 30. The control system 30 may be a single device, but may also be a set of a plurality of devices separate from each other.

The controller 31 is constituted by one or more processors configured to control each of the elements of the control system 30, for example. Specifically, the controller 31 is constituted by one or more types of processors such as a CPU, a GPU, a DSP, an FPGA, or an ASIC.

The storage device 32 is one or more memories configured to store a program executed by the controller 31 and various data used by the controller 31. For example, a known recording medium such as a semiconductor recording medium and a magnetic recording medium, or a combination of different types of recording mediums may be used as the storage device 32.

The communication device 33 communicates with each of the game system 20 and the distribution system 40 via the communication network 2. Specifically, the communication device 33 receives the video data D1 and the status data X from the game system 20. The communication device 33 transmits the video data D2 and the commentary data Y to the distribution system 40.

The operation device 34 is an input device configured to receive operations made by an administrator Op1. The administrator Op1 is an operator that manages and operates the control system 30. For example, the operation device 34 is an operation element operable by the administrator Op1, or a touch panel to detect contact made by the administrator Op1. The display 35 displays various imagery under the control of the controller 31.

Figure 7:
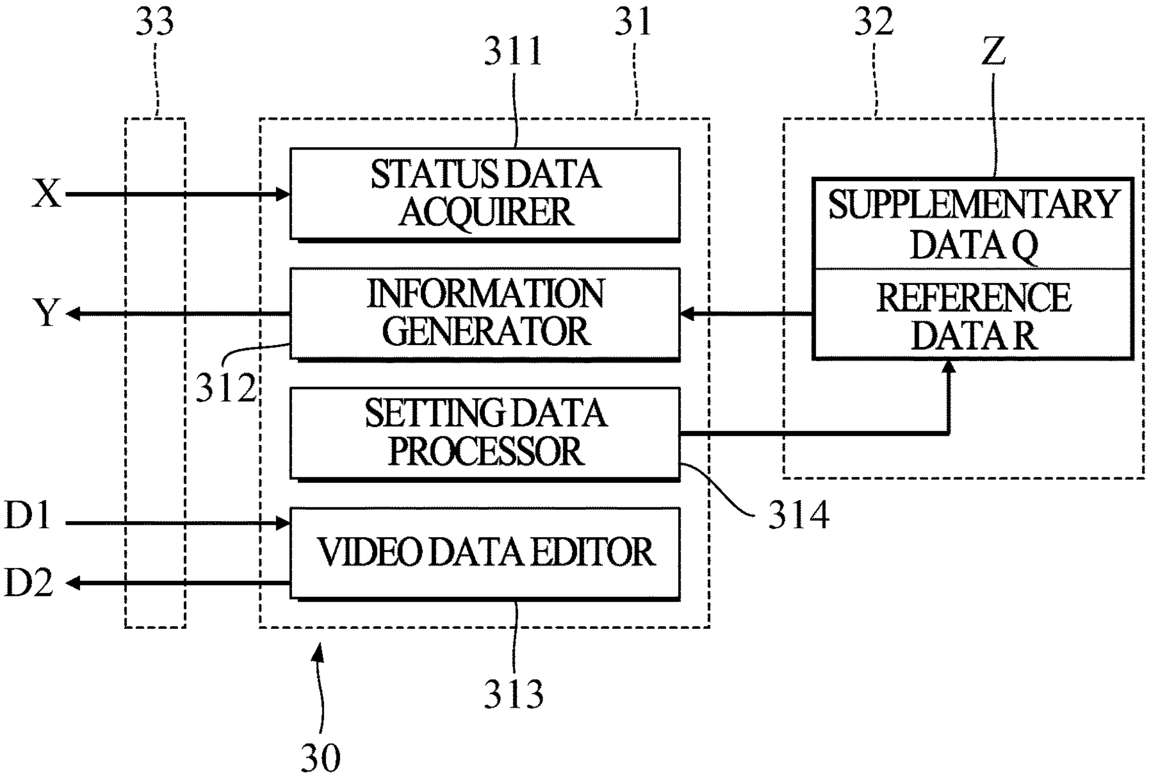
FIG. 7 is a block diagram showing a functional configuration of the control system.

FIG. 7 is a block diagram showing a functional configuration of the control system 30. As shown in FIG. 7, the controller 31 of the control system 30 executes the program stored in the storage device 32 to implement a plurality of functions (a status data acquirer 311, an information generator 312, a video data editor 313, and a setting data processor 314).

The video data editor 313 generates the video data D2 by processing the video data D1, which is received from the game system 20 by the communication device 33. Specifically, the video data editor 313 generates the video data D2 by executing editing processing and conversion processing on the video data D1, for example. The editing processing is processing to edit the video indicated by the video data D1. Specifically, the editing processing includes processing to add various imagery to the imagery indicated by the video data D1. For example, videos obtained by a capturing device capturing each player P, imagery for demonstration, or imagery for decoration is added through the editing processing. The conversion processing is processing to convert a data format. For example, an example of conversion processing is compression processing to convert video data D1 having an uncompressed data format into video data D2 having a compressed data format. As will be understood from the above explanation, the data format of the video data D1 is different from the data format of the video data D2. However, the data format of the video data D1 may be the same as the data format of the video data D2. The video data D1 may be compressed data. A configuration in which the video data editor 313 is included in the game system 20 may be assumed.

The status data acquirer 311 acquires the status data X indicative of the status of the baseball game from the game system 20. Specifically, the status data acquirer 311 receives the status data X, which is transmitted from the game system 20, through the communication device 33.

The information generator 312 generates the commentary text C using the status data X acquired by the status data acquirer 311. In addition, the information generator 312 transmits the commentary data Y indicative of the commentary text C from the communication device 33 to the distribution system 40. To generate the commentary text C, the information generator 312 uses setting data Z together with the status data X. The setting data Z is data that specifies a condition (commentary condition) on the commentary text C. The setting data processor 314 in FIG. 7 generates the setting data Z. In other words, the setting data Z generated by the setting data processor 314 is stored in the storage device 32 and the setting data Z is used to generate the commentary text C by the information generator 312. As shown in FIG. 7, the setting data Z in the first embodiment includes supplementary data Q and reference data R.

The supplementary data Q is a data table in which information used for the commentary text C is registered. Specifically, the supplementary data Q includes information that is not used in the game system 20 (hereinafter, referred to as "supplementary information"). The supplementary information, which is information that is not used to control the baseball game, may be referred to as information that is not stored in the storage device 22 or as information that is not displayed on the play imagery.

FIG. 8 is a schematic diagram showing specific contents of the supplementary data Q. As shown in FIG. 8, the supplementary data Q is data in which a player name q1 and a total record q2 are registered for each of the player Pa and the player Pb.

The player name q1 is a name individually set for each player P. In the game system 20, each player P is identified by generic identification information, such as "Player 1" and "Player 2" (i.e., information shared by a plurality of players P), and the name individually set for each player P is not used. Thus, the player name q1 registered in the supplementary data Q is the supplementary information that is not used in the game system 20.

The total record q2 is a total record in previous plural matches played by each player P. Specifically, the total record q2 includes total wins and total losses q21, total home runs q22, and total strikeouts q23. The total wins and total losses q21 includes the number of wins, the number of losses, and the number of draws in the previous plural matches for each player P. The total home runs q22 is a numerical value obtained by summing up the number of home runs in the previous plural matches for each player P. The total strikeouts q23 is a numerical value obtained by summing up the number of grabbing strikeouts in the previous plural matches for each player P. In the game system 20, a record of each player P in the baseball game is initialized for each match, and the total record in plural matches is not used. Accordingly, the total record q2 (q21 to q23) registered in the supplementary data Q is the supplementary information that is not used in the game system 20.

The reference data R is a data table in which the information used for the commentary text C and a condition for generating the commentary text C are registered. FIG. 9 is a schematic diagram showing specific contents of the reference data R. As shown in FIG. 9, the reference data R is the data table in which a plurality of pieces of registered text r1 is registered. Each of the pieces of registered text r1 corresponds to one of the event types x3. One or more pieces of registered text r1 are registered for one event type x3. In other words, one piece of registered text r1 may be registered for one event type x3, or alternatively, a plurality of pieces of registered text r1 may be registered for one event type x3 in duplicate.

Each of the pieces of registered text r1 is text that constitutes part or all of the commentary text C. Specifically, the registered text r1 is text that includes one or more words, one or more sentences, or a combination thereof. The information generator 312 generates the commentary text C by using one or more pieces of registered text (hereinafter, referred to as "selected registered text") r1 selected from among the plurality of pieces of registered text r1 in accordance with the status data X. The one or more pieces of selected registered text r1 are one or more pieces of registered text r1, which correspond to the event type x3 indicated by the status data X, among the plurality of pieces of registered text r1. In other words, the registered text r1 corresponding to the event type x3 of the most recently event in the baseball game is selected as the selected registered text r1 for generation of the commentary text C.

Among the plurality of pieces of registered text r1, there is a piece of registered text r1 that includes one or more variable portions. The variable portion is a portion of the registered text r1, and variable information on the status of the baseball game is to be inserted into the variable portion. The information generator 312 generates the commentary text C by inserting information into the variable portion of the selected registered text r1. By changing the information that is to be inserted into the variable portion, different pieces of commentary text C are generated from one piece of registered text r1. In other words, the registered text r1 is fixed text that is shared between different pieces of commentary text C. Among the plurality of pieces of registered text r1 in the reference data R, there is a piece of registered text r1 that includes no variable portions.

Regarding the variable portion of each of the pieces of registered text r1, information that is to be inserted into the variable portion is specified. Specifically, a piece of information among plural pieces of information that include pieces of information (x3 to x7) in the status data X and pieces of information (q1, q2) in the supplementary data Q is specified for each variable portion. The information generator 312 generates the commentary text C by inserting the information, which is specified for the variable portion of the selected registered text r1, into the variable portion of the selected registered text r1. The information (q1, q2) included in the supplementary data Q is the supplementary information as described above. Accordingly, the commentary text C indicated by the commentary data Y may include the supplementary information.

Figure 10:
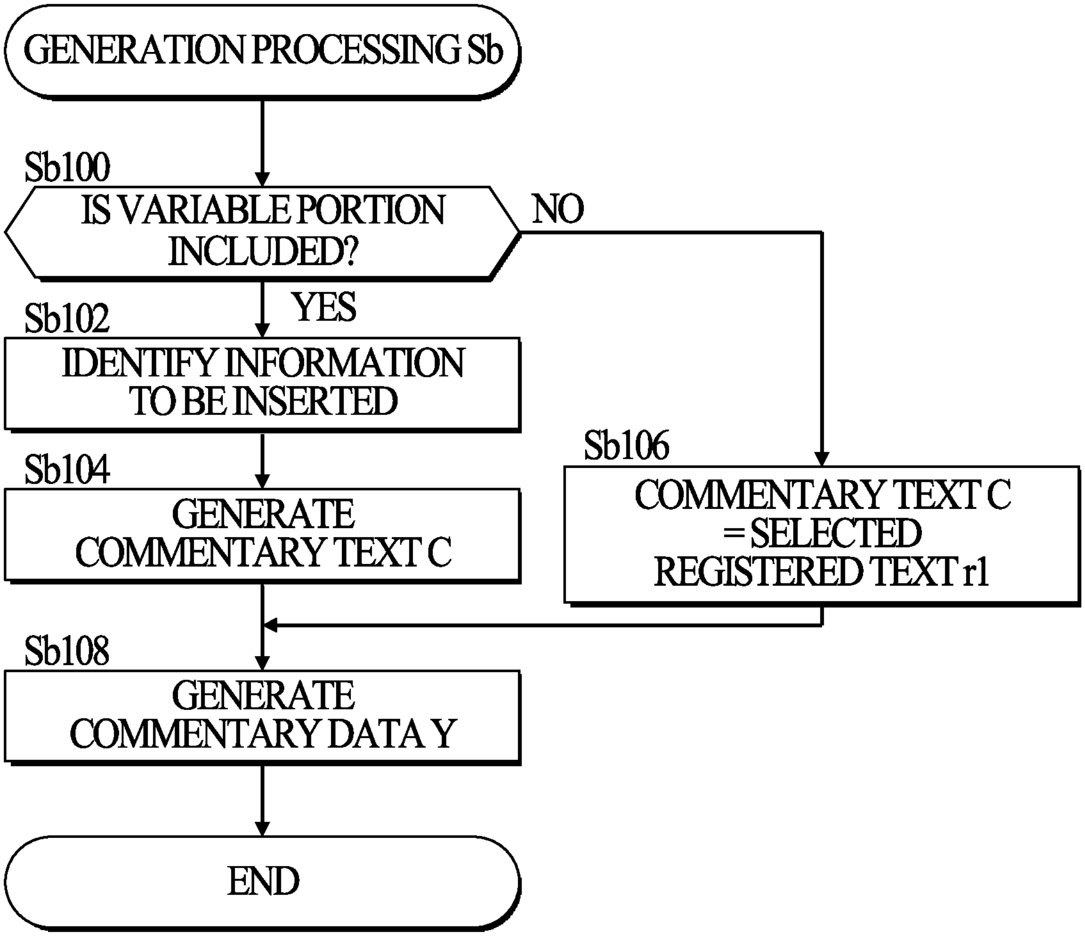
FIG. 10 is a flow chart showing a specific procedure of generation processing.

FIG. 10 is a flow chart showing a specific procedure of processing (hereinafter, referred to as "generation processing") Sb in which the information generator 312 generates the commentary text C using the selected registered text r1.

When the generation processing Sb starts, the information generator 312 determines whether the selected registered text r1 includes a variable portion (Sb100). In response to the selected registered text r1 including a variable portion (Sb100: YES), the information that is to be inserted into the variable portion is identified from the status data X or from the supplementary data Q (Sb102). Specifically, from among the plural pieces of information that include the pieces of information (x3 to x7) in the status data X and the pieces of information (q1, q2) in the supplementary data Q, information specified for the variable portion is identified. The information generator 312 generates the commentary text C by inserting the information into the variable portion of the selected registered text r1 (Sb104). On the other hand, in response to the selected registered text r1 including no variable portion (Sb100: NO), the information generator 312 determines the selected registered text r1 as the commentary text C (Sb106). The information generator 312 generates the commentary data Y indicative of the commentary text C that is determined through the procedure (Sb104, Sb106) described above (Sb108).

For example, it is assumed that the status data acquirer 311 acquires the status data X[3] in FIG. 5. The selected registered text r1 is a piece of registered text r1 "[q1] got a double!", which corresponds to the event type x3 "double" of the status data X[3], among the plurality of pieces of registered text r1 of the reference data R. The selected registered text r1 includes a variable portion for which the player name q1 of the supplementary data Q is specified. The target player x4 indicated by the status data X[3] is the player Pa; accordingly, the information generator 312 generates the commentary text C "AAA got a double!" by inserting the player name q1 "AAA", which is indicated for the player Pa by the supplementary data Q, into the variable portion.

It is assumed that the status data acquirer 311 acquires the status data X[7] in FIG. 5. The selected registered text r1 is a piece of registered text r1 "[q1] got [x7]th strikeout!", which corresponds to the event type x3 "grabbing strikeout" of the status data X[7], among the plurality of pieces of registered text r1 of the reference data R. The selected registered text r1 includes a variable portion, for which the player name q1 is specified, and a variable portion, for which the control information x7 is specified. The target player x4 indicated by the status data X[7] is the player Pb; accordingly, the information generator 312 generates the commentary text C "BBB got 3th strikeout!" not only by inserting the player name q1 "BBB", which is indicated for the player Pb by the supplementary data Q, into the first variable portion, but also by inserting the control information x7 "3" of the status data X[7] into the second variable portion.

In FIG. 9, a piece of registered text r1 corresponding to the event type x3 "home run" is "[q1] got [q22+x7]th home run in this season!". The sum of the total home runs q22 indicated by the supplementary data Q and the numerical value indicated by the control information x7 of the status data X is inserted into the second variable portion of the registered text r1. For example, when the total home runs q22 indicates "29" and the control information x7 indicates "1" (q22+x7=30), the commentary text C "AAA got 30th home run in this season!" is generated as shown in FIG. 2. As shown above, the information generator 312 may generate information (including the supplementary information), which is to be inserted into an inserted portion, by using a combination of two or more pieces of information among the plural pieces of information that includes the pieces of information (x3 to x7) in the status data X and the pieces of information (q1, q2) in the supplementary data Q.

As shown in FIG. 9, the reference data R includes permission data r2 (r2*a*, r2*b*) for each of the pieces of registered text r1. The permission data r2 corresponding to a piece of registered text r1 is data indicative of permission (P: permission) or prohibition (NP: no permission) of generation of the commentary text C including the piece of registered text r1. The permission data r2 is set for each player P. Specifically, the permission data r2*a* is data on the player Pa, whereas the permission data r2*b* is data on the player Pb. For example, when the permission data r2*a* corresponding to a piece of registered text r1 indicates permission, the information generator 312 generates the commentary text C, which corresponds to the player Pa, from the piece of registered text r1. On the other hand, when the permission data r2*a* indicates no permission, the information generator 312 does not generate commentary text C including the piece of registered text r1. This similarly applies to the permission data r2*b*. The permission data r2 may be omitted from the reference data R.

As shown in FIG. 9, the reference data R includes condition data r3 for one or more pieces of registered text r1 among the plurality of pieces of registered text r1. The condition data r3 corresponding to a piece of registered text r1 is data indicative of a condition (hereinafter, referred to as a "generation condition") for generating the commentary text C including the piece of registered text r1. Specifically, the generation condition indicated by the condition data r3 is a condition related to the current status of the baseball game. For example, for the registered text r1 "[q1] got [total home runs q22+control information x7]th home run in this season!", a generation condition is registered in which the sum of the total home runs q22 and the numerical value of the control information x7 is a multiple of 10 (q22+x7=10n, where n is a natural number). The information generator 312 generates the commentary text C including the registered text r1 when the generation condition indicated by the condition data r3 is satisfied, whereas the information generator 312 does not generate the commentary text C including the registered text r1 when the generation condition is not satisfied. The plurality of pieces of registered text r1 includes a piece of registered text r1, for which condition data r3 is registered, and a piece of registered text r1, for which condition data r3 is not registered. Regarding the piece of registered text r1 for which condition data r3 is not registered, the commentary text C is generated only on the condition that the permission data r2 indicates permission. The condition data r3 may be omitted from the reference data R.

As will be understood from the above examples, the player name q1 and the total record q2 of the supplementary data Q and the registered text r1 of the reference data R are data indicative of conditions for the contents of commentary text C. On the other hand, the permission data r2 and the condition data r3 of the reference data R are data indicative of conditions for generation of commentary text C. Accordingly, the setting data Z including the supplementary data Q and the reference data R is referred to as data for setting a condition (a condition for the contents or generation) for commentary text C.

Figure 11:
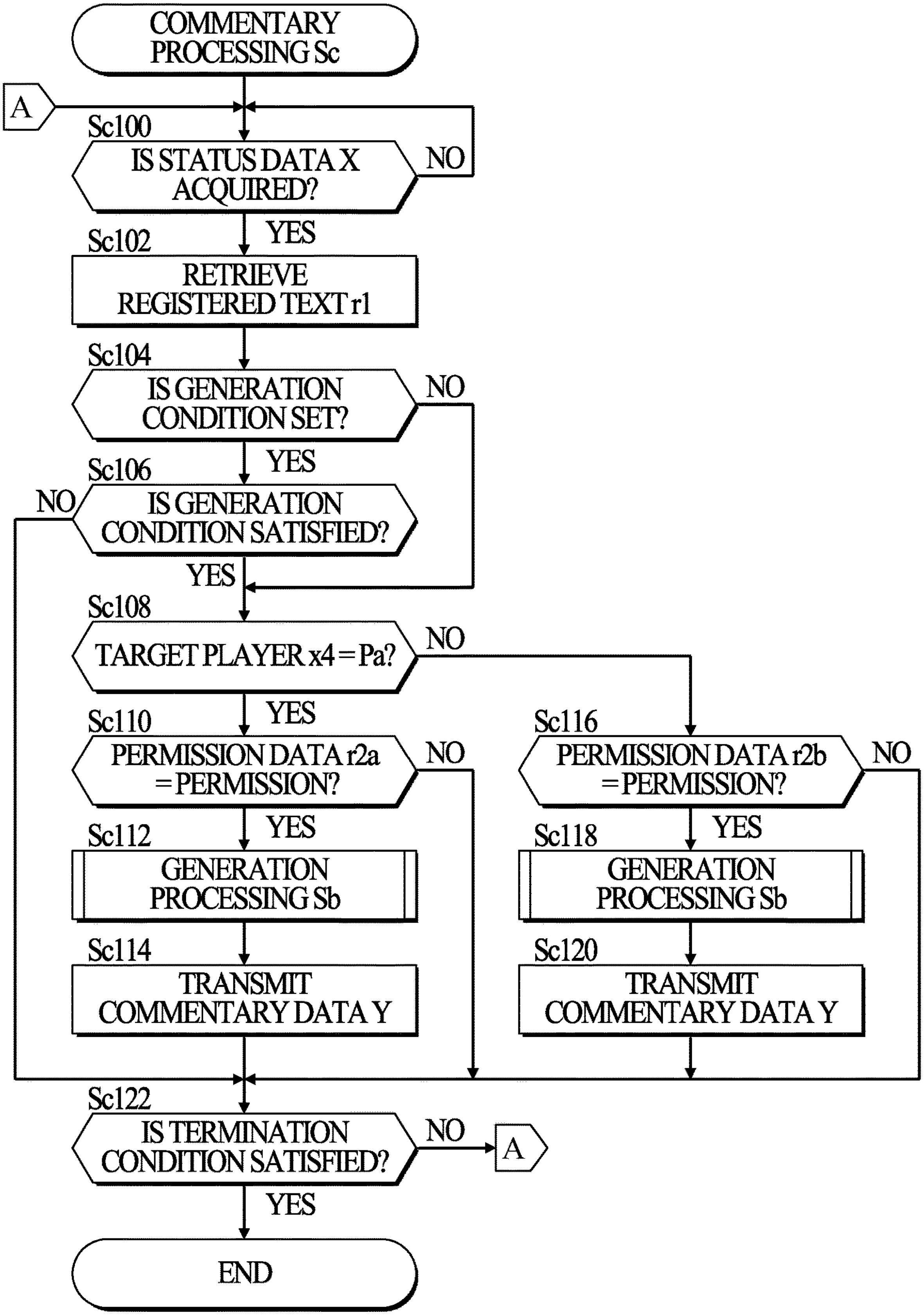
FIG. 11 is a flow chart showing a specific procedure of commentary processing.

FIG. 11 is a flow chart showing a specific procedure of processing (hereinafter referred to as "commentary processing") Sc in which the controller 31 of the control system 30 generates the commentary data Y. The commentary processing Sc, which starts in response to an instruction from the administrator Op1 to the operation device 34, continues in parallel with the progress of the baseball game. The commentary processing Sc is an example of an "information processing method."

When the commentary processing Sc starts, the status data acquirer 311 waits until the status data X is acquired from the game system 20 (Sc100: NO). In response to the status data acquirer 311 acquiring the status data X (Sc100: YES), the information generator 312 retrieves a piece of selected registered text r1, which corresponds to the status indicated by the status data X, from among the plurality of pieces of registered text r1 registered in the reference data R (Sc102). Specifically, the information generator 312 retrieves a piece of registered text r1, which corresponds to the event type x3 of the status data X, from the reference data R.

The information generator 312 determines whether the condition data r3 is registered for the piece of selected registered text r1 (Sc104). In other words, it is determined whether the generation condition is set for the commentary text C including the piece of selected registered text r1. In response to the condition data r3 being registered (Sc104: YES), the information generator 312 determines whether the generation condition indicated by the condition data r3 is satisfied (Sc106). In response to the generation condition not being satisfied (Sc106: NO), the information generator 312 returns the processing to step Sc122 described below. On the other hand, in response to the condition data r3 not being registered (Sc104: NO) or in response to the generation condition being satisfied (Sc106: YES), the information generator 312 executes processing (Sc108 to Sc120) to generate the commentary text C including the piece of selected registered text r1. In other words, regarding the selected registered text r1 for which the generation condition is set, the information generator 312 generates the commentary text C including the selected registered text r1 when the generation condition is satisfied.

The information generator 312 determines whether the target player x4 included in the status data X is the player Pa (Sc108). In response to the target player x4 being the player Pa (Sc108: YES), the information generator 312 determines whether the permission data r2_a_ corresponding to the piece of selected registered text r1 indicates permission (Sc110). In response to the permission data r2_a_ of the player Pa indicating permission (Sc110: YES), the information generator 312 generates the commentary data Y of the commentary text C including the piece of selected registered text r1 through the generation processing Sb described above (Sc112). In other words, the commentary text C, which includes the registered text r1 corresponding to the event indicated by the status data X, is generated. The information generator 312 transmits the commentary data Y from the communication device 33 to the distribution system 40 (Sc114). On the other hand, in response to the permission data r2_a_ indicating no permission (Sc110: NO), the information generator 312 executes neither generation (Sc112) nor transmission (Sc114) of the commentary data Y.

In response to the target player x4 being the player Pb (Sc108: NO), the information generator 312 determines whether the permission data r2_b_ corresponding to the piece of selected registered text r1 indicates permission (Sc116). In response to the permission data r2_b_ of the player Pb indicating permission (Sc116: YES), the information generator 312 generates the commentary data Y of the commentary text C including the piece of selected registered text r1 through the generation processing Sb described above (Sc118). The information generator 312 transmits the commentary data Y from the communication device 33 to the distribution system 40 (Sc120). On the other hand, in response to the permission data r2_b_ indicating no permission (Sc116: NO), the information generator 312 executes neither generation (Sc118) nor transmission (Sc120) of the commentary data Y.

In response to executing the processing described above, the controller 31 determines whether a predetermined termination condition is satisfied (Sc122). The termination condition is, for example, an instruction of termination from the administrator Op1 to the operation device 34, or a notice of the termination of the baseball game from the game system 20. In response to the termination condition not being satisfied (Sc122: NO), the controller 31 returns the processing to step Sc100. In other words, the processing is returned to a state in which the status data acquirer 311 waits for acquisition of the status data X. On the other hand, in response to the termination condition being satisfied (Sc122: YES), the controller 31 terminates the commentary processing Sc. The specific embodiment of the commentary processing Sc is described above.

The game server 50 in FIG. 1 is a server system configured to manage game data for each of the players P registered in advance. The game data for the respective players P is a record of play of the baseball game regarding the respective players P. Specifically, in the game data for each of the players P, the player name of the player P and the past record of the player P (the number of wins, the number of losses, the number of home runs, the number of grabbing strikeouts, the number of strikeouts, etc.) are registered.

Figure 12:
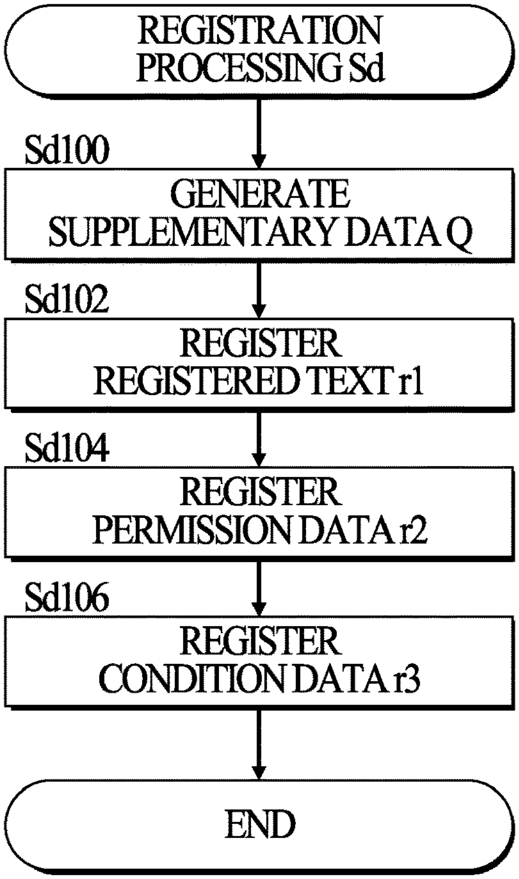
FIG. 12 is a flow chart showing a specific procedure of registration processing.

The setting data processor 314 in FIG. 7 generates the setting data Z that is used in the commentary processing Sc. FIG. 12 is a flow chart showing a specific procedure of processing (hereinafter, referred to as "registration processing") Sd in which the setting data processor 314 generates the setting data Z. Prior to the beginning of a competition event, the registration processing Sd is executed in response to an instruction from the administrator Op1 to the operation device 34. The registration processing Sd is executed for each competition event or for each match of the baseball game in a competition event. The registration processing Sd may be executed for each distribution of a series of game videos G (for example, for each program).

When the registration processing Sd starts, the setting data processor 314 generates the supplementary data Q of the setting data Z (Sd100). Specifically, the setting data processor 314 generates the supplementary data Q on a match between the player Pa and the player Pb by referring to the game data managed for each of the player Pa and the player Pb by the game server 50. For example, the setting data processor 314 acquires the player name registered in the game data as the player name q1 of the supplementary data Q. In addition, the setting data processor 314 sums the records registered in the game data (the number of wins, the number of losses, the number of home runs, and the number of grabbing strikeouts) to calculate the total record q2 of the supplementary data Q (the total wins and total losses q21, the total home runs q22, and the total strikeouts q23), for example. The setting data processor 314 may set the respective elements (q1, q2) of the supplementary data Q in accordance with an instruction from the administrator Op1 to the operation device 34.

The setting data processor 314 generates the reference data R in accordance with an instruction from the administrator Op1 to the operation device 34 (Sd102 to Sd106). The order of the generation of the supplementary data Q (Sd100) and the generation of reference data R (Sd102 to Sd106) may be reversed.

The administrator Op1 operates the operation device 34 to indicate freely selected pieces of registered text r1 to the control system 30. The setting data processor 314 registers the pieces of registered text r1, which are indicated by the administrator Op1, in the reference data R (Sd102). Specifically, the setting data processor 314 registers pieces of registered text r1, which are selected from among a plurality of previously prepared pieces of registered text r1 by the administrator Op1, or pieces of registered text r1, which are directly entered by the administrator Op1 using the operation device 34, in the reference data R. The setting data processor 314 may change the contents of an existing piece of registered text r1 in accordance with an instruction from the administrator Op1.

The administrator Op1 indicates the pieces of registered text r1, for example, in accordance with various circumstances such as deployments expected for the baseball game or a tendency of the user U to watch the distributed video V. For example, if a pitching duel is expected due to great pitching made by pitchers of both teams, a number of pieces of registered text r1 regarding pitching such as a pitch type are registered in the reference data R. For example, if a slugfest in which a large number of runs are scored is expected due to activity of batters of both teams, a number of pieces of registered text r1 regarding batting such as the number of home runs or a batting average are registered in the reference data R. If many users U that have mastered the baseball game is expected to watch, a number of pieces of registered text r1 regarding the baseball game such as a batting average of each character in the baseball game or on-base percentage of each character are registered in the reference data R. As will be understood from the above description, in the first embodiment, the registered text r1 corresponding to an instruction from the administrator Op1 is registered; accordingly, the user U can be provided with the commentary text C having a tendency in accordance with the intention of the administrator Op1.

In addition, the administrator Op1 operates the operation device 34 to enter an instruction, which indicates for each player P whether the commentary text C including a piece of registered text r1 is allowed to be generated, to the control system 30. The setting data processor 314 registers permission data r2 (r2*a*, r2*b*), which is set to either permission or no permission in accordance with the instruction from the administrator Op1, in the reference data R (Sd104). For example, it is assumed that a configuration in which the permission data r2 is individually registered for each piece of registered text r1. However, the permission data r2 may be registered collectively for the plurality of pieces of registered text r1. For example, in a configuration in which a plurality of pieces of registered text r1 are classified into plural sets in accordance with the contents of each of the pieces of registered text r1, the setting data processor 314 sets the permission data r2 for each of the plural sets. In other words, a plurality of pieces of permission data r2, which corresponds to different pieces of registered text r1 in a set, is set to the same numerical value in accordance with an instruction on the set from the administrator Op1.

Depending on various circumstances regarding distribution of the distributed video V, a situation is assumed in which a commentary on the player Pa should have priority over a commentary on the player Pb. In this situation, the administrator Op1 sets permission of generation of commentary text C to a large number of pieces of registered text r1 for the player Pa, and the administrator Op1 sets no permission of generation of commentary text C to a large number of piece of registered text r1 for the player Pb. Accordingly, the setting data processor 314 sets the permission data r2 in accordance with an instruction from the administrator Op1 so that the ratio of the pieces of permission data r2*a* indicative of permission exceeds the ratio of the pieces of permission data r2*b* indicative of permission. In other words, the commentary text C on the player Pa is generated at a higher frequency compared to the commentary text C on the player Pb. A situation may be assumed in which the commentary text C on the player Pa should be generated at the same frequency as the commentary text C on the player Pb. In this situation, the setting data processor 314 sets the permission data r2*a* and the permission data r2*b*, which correspond to a piece of registered text r1, to the same numerical value in accordance with an instruction from the administrator Op1. Accordingly, the commentary text C on the player Pa and the commentary text C on the player Pb are generated at substantially the same frequency. As will be understood from the above description, in the first embodiment, it is possible to adjust the frequency, at which the commentary text C on the player Pa is generated, and the frequency, at which the commentary text C on the player Pb is generated, in accordance with the intention of the administrator Op1.

In addition, the administrator Op1 operates the operation device 34 to enter an instruction, which indicates a generation condition for a desired piece of registered text r1 among the plurality of pieces of registered text r1, to the control system 30. The setting data processor 314 registers the condition data r3, which indicates the generation condition indicated by the administrator Op1 for the piece of registered text r1 indicated by the administrator Op1, in the reference data R (Sd106). Specifically, the setting data processor 314 registers condition data r3, which indicates a generation condition selected from among a plurality of previously prepared generation conditions by the administrator Op1, or condition data r3, which indicates a generation condition directly entered by the administrator Op1 using the operation device 34, in the reference data R. In addition, the setting data processor 314 may change the contents of a generation condition indicated by existing condition data r3 in accordance with an instruction from the administrator Op1. The reference data R generated through the registration processing Sd described above is stored in the storage device 32 and is used in the commentary processing Sc described above.

The distribution system 40 in FIG. 1 is, for example, a computer system operated by a provider of a video distribution site. The distribution system 40 receives the commentary data Y and the video data D2 transmitted from the control system 30. The distribution system 40 transmits the commentary data Y and the video data D2 to the terminal apparatus 10. For example, the distribution system 40 transmits the commentary data Y and the video data D2 to a delivery destination that is either a terminal apparatus 10, which has transmitted a delivery request to the distribution system 40, or a terminal apparatus 10, which has been registered in the distribution system 40.

Figure 13:
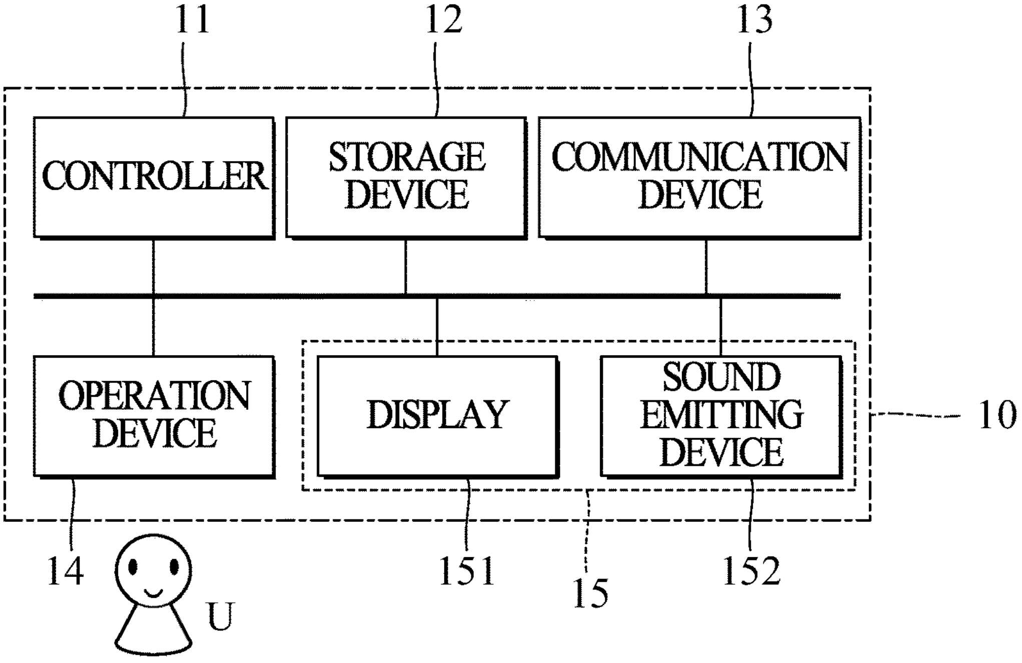
FIG. 13 is a block diagram showing a configuration of a terminal apparatus.

FIG. 13 is a block diagram showing a configuration of the terminal apparatus 10. As shown in FIG. 13, the terminal apparatus 10 includes a controller 11, a storage device 12, a communication device 13, an operation device 14, and a play device 15. The terminal apparatus 10 may be a single device, but may also be a set of a plurality of devices separate from each other.

The controller 11 is constituted by one or more processors configured to control each of the elements of the terminal apparatus 10, for example. Specifically, the controller 11 is constituted by one or more types of processors such as a CPU, a GPU, a DSP, an FPGA, or an ASIC.

The storage device 12 is one or more memories configured to store a program executed by the controller 11 and various data used by the controller 11. For example, a known recording medium such as a semiconductor recording medium and a magnetic recording medium, or a combination of different types of recording mediums, may be used as the storage device 12.

The communication device 13 communicates with the distribution system 40 via the communication network 2. Specifically, the communication device 13 receives the commentary data Y and the video data D2 from the distribution system 40. The operation device 14 is an input device configured to receive operations made by the user U. For example, the operation device 14 is an operation element operable by the user U, or a touch panel to detect contact made by the user U.

The play device 15 plays the distributed video V under the control of the controller 11. The play device 15 includes a display 151 and a sound emitting device 152. The display 151 displays imagery under the control of the controller 11. Specifically, the controller 11 causes the display 151 to display the distributed video V, which includes the game video G indicated by the video data D2 and the commentary text C indicated by the commentary data Y, in FIG. 2. More specifically, a plurality of pieces of commentary text C corresponding to different events are displayed in the commentary area Va of the distributed video V in chronological order. In other words, in addition to the commentary text C corresponding to the most recent event, the commentary text C corresponding to the past event is displayed in the commentary area Va. The sound emitting device 152 emits audio sounds under the control of the controller 11. Specifically, the sound emitting device 152 emits audio sounds for the game video G indicated by the video data D2. The function in which the controller 11 causes the play device 15 to play the distributed video V may be implemented by a general-purpose browser or may be implemented by a dedicated application program. While understanding the progress of the game by viewing the game video G, the user U of the terminal apparatus 10 can confirm detailed information on the status of the progress by referring to each of the pieces of commentary text C.

As described above, in the first embodiment, the commentary text C on the status of the baseball game is automatically generated not only by use of the status data X indicative of the status of the baseball game, but also by use of the setting data Z specifying the condition for the commentary text C, and the commentary text C is played together with the game video G. Thus, for example, it is possible to reduce a load of the administrator Op1 for generating the commentary text C compared to a configuration in which the administrator Op1 enters respective pieces of commentary text C by manually operating the operation device 34 at appropriate points in time during the progress of the baseball game.

In particular, the commentary text C including the supplementary information that is not used in the game system 20 is generated in the first embodiment; accordingly, it is possible to provide the user U of the terminal apparatus 10 with the commentary text C having rich content and much information compared to a configuration that generates commentary text C from only the status data X. For example, the commentary text C is provided which includes the player name q1 of each player P and the total record q2 in plural matches. In the first embodiment, the terminal apparatus plays the commentary text C that includes a piece of registered text r1, which corresponds to the event that occurs in the baseball game, among the plurality of pieces of registered text r1. Accordingly, the user U of the terminal apparatus 10 can easily understand the event that occurs in the baseball game.

In addition, the commentary text C including a piece of registered text r1 is generated when the generation condition corresponding to the piece of registered text r1 is satisfied. In other words, regarding a predetermined piece of registered text r1, commentary text C is not generated when only an event corresponding to the piece of registered text r1 occurs, but the commentary text C is generated when the generation condition is further satisfied. Accordingly, it is possible to generate the commentary text C including the predetermined piece of registered text r1 in only a predetermined circumstance. Additionally, in the first embodiment, permission or no permission of generation of the commentary text C including a piece of registered text r1 is set for each player P; accordingly, it is possible to provide the user U of the terminal apparatus 10 with the commentary text C having suitable contents for each player P.

Second Embodiment

A second embodiment of the present disclosure will be described. In the embodiments shown in the following, elements having the same functions as in the first embodiment are denoted by the same reference numerals as used for like elements in the description of the first embodiment, and detailed description thereof is omitted, as appropriate.

The setting data Z in the second embodiment includes first reference data Ra and second reference data Rb in FIG. 14, instead of the reference data R in the first embodiment. The first reference data Ra is a data table that is used to generate the commentary text C on the player Pa, whereas the second reference data Rb is a data table that is used to generate the commentary text C on the player Pb. In other words, the reference data R includes the first reference data Ra and the second reference data Rb. The contents of the supplementary data Q of the setting data Z is the same as that of the first embodiment.

A plurality of pieces of registered text r1 is registered in the first reference data Ra. Each of the plurality of pieces of registered text r1 corresponds to one of the event types x3. Each of the pieces of registered text r1 in the first reference data Ra is used to generate the commentary text C on the player Pa. Similarly, a plurality of pieces of registered text r1 is registered in the second reference data Rb. Each of the plurality of pieces of registered text r1 corresponds to one of the event types x3. Each of the pieces of registered text r1 in the second reference data Rb is used to generate the commentary text C on the player Pb. The pieces of registered text r1 in the first reference data Ra and the pieces of registered text r1 in the second reference data Rb are set separately. Thus, the first reference data Ra and the second reference data Rb are differ from each other in the number of pieces of registered text r1 and in the contents of pieces of registered text r1. Accordingly, the commentary text C on the player Pa and the commentary text C on the player Pb, which differ from each other, are generated.

The administrator Op1 operates the operation device 34 to enter an instruction, which indicates the plurality of pieces of registered text r1 that is used to generate the commentary text C on the player Pa, and an instruction, which indicates the plurality of pieces of registered text r1 that is used to generate the commentary text C on the player Pb, separately. The setting data processor 314 registers the plurality of pieces of registered text r1, which is indicated for the player Pa by the administrator Op1, in the first reference data Ra, and the setting data processor 314 registers the plurality of pieces of registered text r1, which is indicated for the player Pb by the administrator Op1, in the second reference data Rb. In other words, the respective pieces of registered text r1 in the first reference data Ra are information, which is permitted to be used to generate the commentary text C on the player Pa by the administrator Op1, whereas the respective pieces of registered text r1 in the second reference data Rb are information, which is permitted to be used to generate the commentary text C on the player Pb by the administrator Op1. Accordingly, the reference data R in the second embodiment does not include the permission data r2 (r2*a*, r2*b*) shown in the first embodiment.

Figure 15:
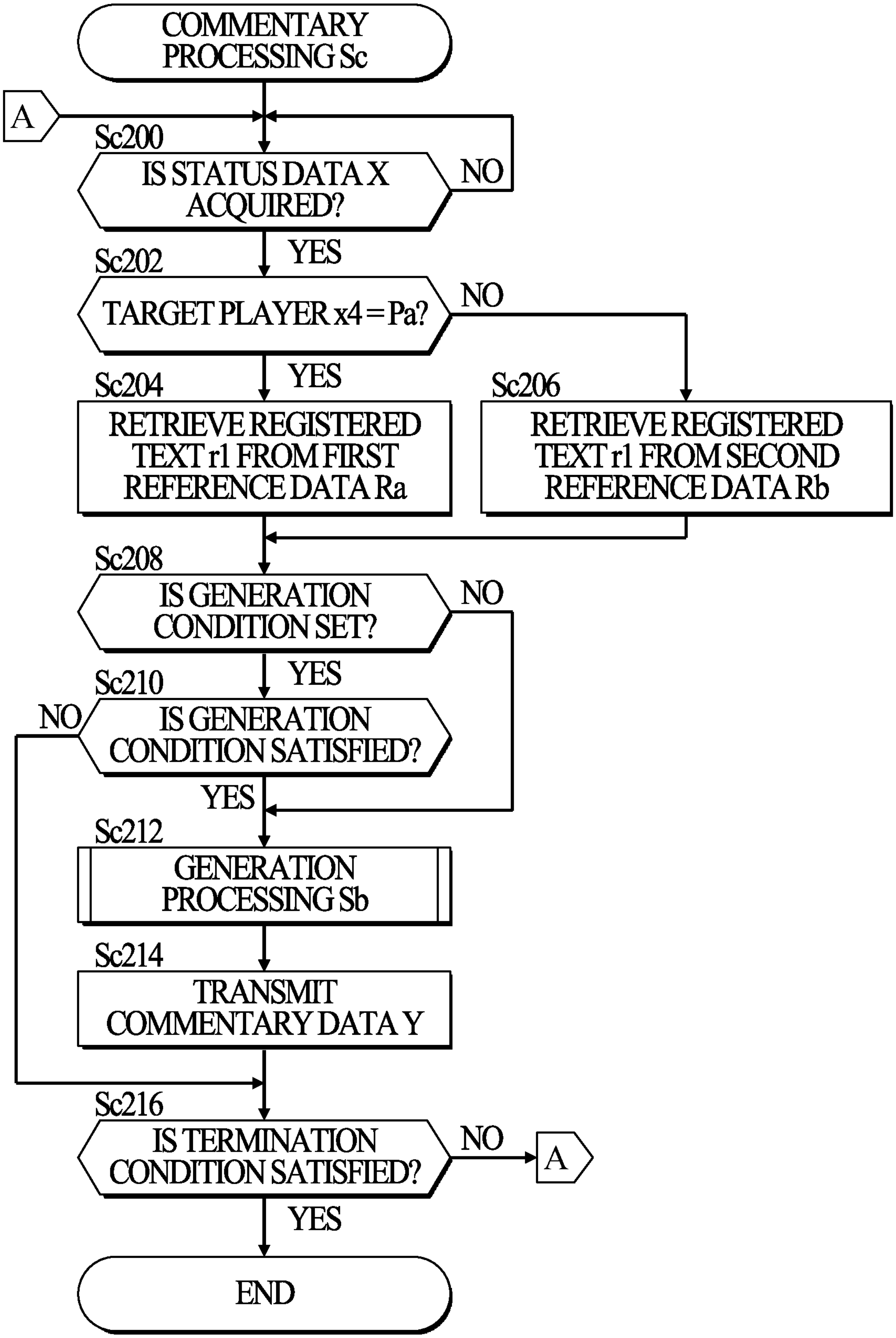
FIG. 15 is a flow chart showing a specific procedure of commentary processing in the second embodiment.

FIG. 15 is a flow chart showing a specific procedure of the commentary processing Sc according to the second embodiment. As in the first embodiment, the commentary processing Sc, which starts in response to an instruction from the administrator Op1 to the operation device 34, continues in parallel with the progress of the baseball game.

When the commentary processing Sc starts, the status data acquirer 311 waits until the status data X is acquired from the game system 20 (Sc200: NO). In response to the status data acquirer 311 acquiring the status data X (Sc200: YES), the information generator 312 determines whether the target player x4 included in the status data X is the player Pa (Sc202).

In response to the target player x4 being the player Pa (Sc202: YES), the information generator 312 retrieves a piece of selected registered text r1, which corresponds to the status indicated by the status data X, from among the plurality of pieces of registered text r1 registered in the first reference data Ra (Sc204). On the other hand, in response to the target player x4 being the player Pb (Sc202: NO), the information generator 312 retrieves a piece of selected registered text r1, which corresponds to the status indicated by the status data X, from among the plurality of pieces of registered text r1 registered in the second reference data Rb (Sc206).

The information generator 312 determines whether the condition data r3 is registered for the piece of selected registered text r1 (Sc208). In response to the condition data r3 being registered (Sc208: YES), the information generator 312 determines whether the generation condition indicated by the condition data r3 is satisfied (Sc210). In response to the condition data r3 not being registered (Sc208: NO) or in response to the generation condition being satisfied (Sc210: YES), the information generator 312 generates the commentary data Y of the commentary text C including the piece of selected registered text r1 through the generation processing Sb (Sc212). The information generator 312 transmits the commentary data Y from the communication device 33 to the distribution system 40 (Sc214). On the other hand, in response to the generation condition not being satisfied (Sc210: NO), the information generator 312 executes neither generation (Sc212) nor transmission (Sc214) of the commentary data Y.

The controller 31 repeats processing (Sc200 to Sc214) described above until a predetermined termination condition is satisfied (Sc216: NO). In response to the termination condition being satisfied (Sc216: YES), the controller 31 terminates the commentary processing Sc.

In the second embodiment, the same effects as in the first embodiment are provided. Additionally, in the second embodiment, the commentary text C on the player Pa includes the registered text r1 in the first reference data Ra, whereas the commentary text C on the player Pb includes the registered text r1 in the second reference data Rb. Therefore, it is possible to provide the user U of the terminal apparatus 10 with the commentary text C having suitable contents for each player P.

Third Embodiment

In the first embodiment, a configuration is described in which the game system 20 transmits the status data X to the control system 30 for all of the events that occurs in the baseball game. In a third embodiment, when an event occurs that satisfies a specific condition (hereinafter, referred to as a "transmission condition") among a plurality of events that may occur in the baseball game, the status data X indicative of the event is transmitted from the game system 20 to the control system 30.

Figure 16:
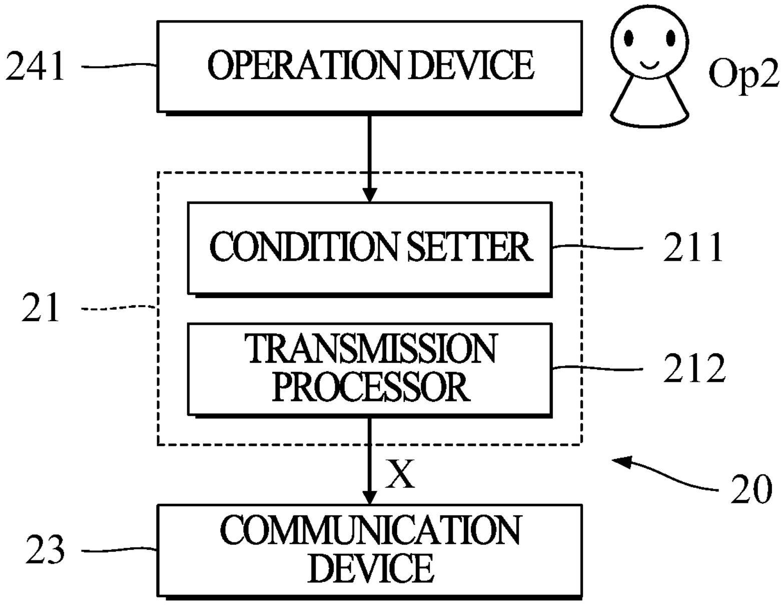
FIG. 16 is a block diagram showing a functional configuration of a game system in a third embodiment.

FIG. 16 is a block diagram showing a functional configuration of the game system 20 according to the third embodiment. As shown in FIG. 16, the controller 21 of the game system 20 executes the program stored in the storage device 22 to implement a plurality of functions (a condition setter 211 and a transmission processor 212). The condition setter 211 is an example of a "first condition setter."

The condition setter 211 sets the transmission condition. The transmission condition is a condition for an event for which the status data X should be transmitted. For example, one or more event types x3 are set as transmission conditions. The condition setter 211 sets the transmission condition in accordance with an instruction from an administrator Op2 to the operation device 241. The administrator Op2, who is an operator that manages and operates the game system 20, is in a venue at which a competition event is held, for example. In response to the administrator Op2 entering an instruction indicative of one or more desired event types x3, the condition setter 211 sets the transmission condition including the one or more event types x3 indicated by the administrator Op2.

The condition setter 211 may set the transmission condition in accordance with an instruction from the administrator Op1 to the operation device 34 of the control system 30. For example, the instruction from the administrator Op1 is notified from the control system 30 to the game system 20, and the condition setter 211 sets the transmission condition in accordance with the instruction notified from the control system 30.

A plurality of event types x3 may be collectively set as a transmission condition. For example, in a configuration in which a plurality of event types x3 are classified into plural sets, the condition setter 211 collectively sets one or more event types x3 belonging to a set selected by the administrator Op2 as a transmission condition. For example, the plurality of event types x3 are classified into an event on the offense and an event on the defense. The event on the offense is, for example, "hit," "home run," "base stealing," "score," or "batter change," whereas the event on the defense is, for example, "grabbing strikeout," "pickoff attempt," "catch a fly," or "pitcher change." When the administrator Op2 selects the event on the offense, the condition setter 211 collectively sets a plurality of event types x3 for the offense such as "hit," "home run," "base stealing," "score," and "batter change" as a transmission condition. On the other hand, when the administrator Op2 selects the event on the defense, the condition setter 211 collectively sets a plurality of event types x3 for the defense such as "grabbing strikeout," "pickoff attempt," "catch a fly," and "pitcher change" as a transmission condition.

When an event that satisfies the transmission condition set by the condition setter 211 occurs in the baseball game, the transmission processor 212 in FIG. 16 transmits the status data X indicative of the event from the communication device 23 to the control system 30. The contents of the status data X are similar to that of the status data X in the first embodiment.

Figure 17:
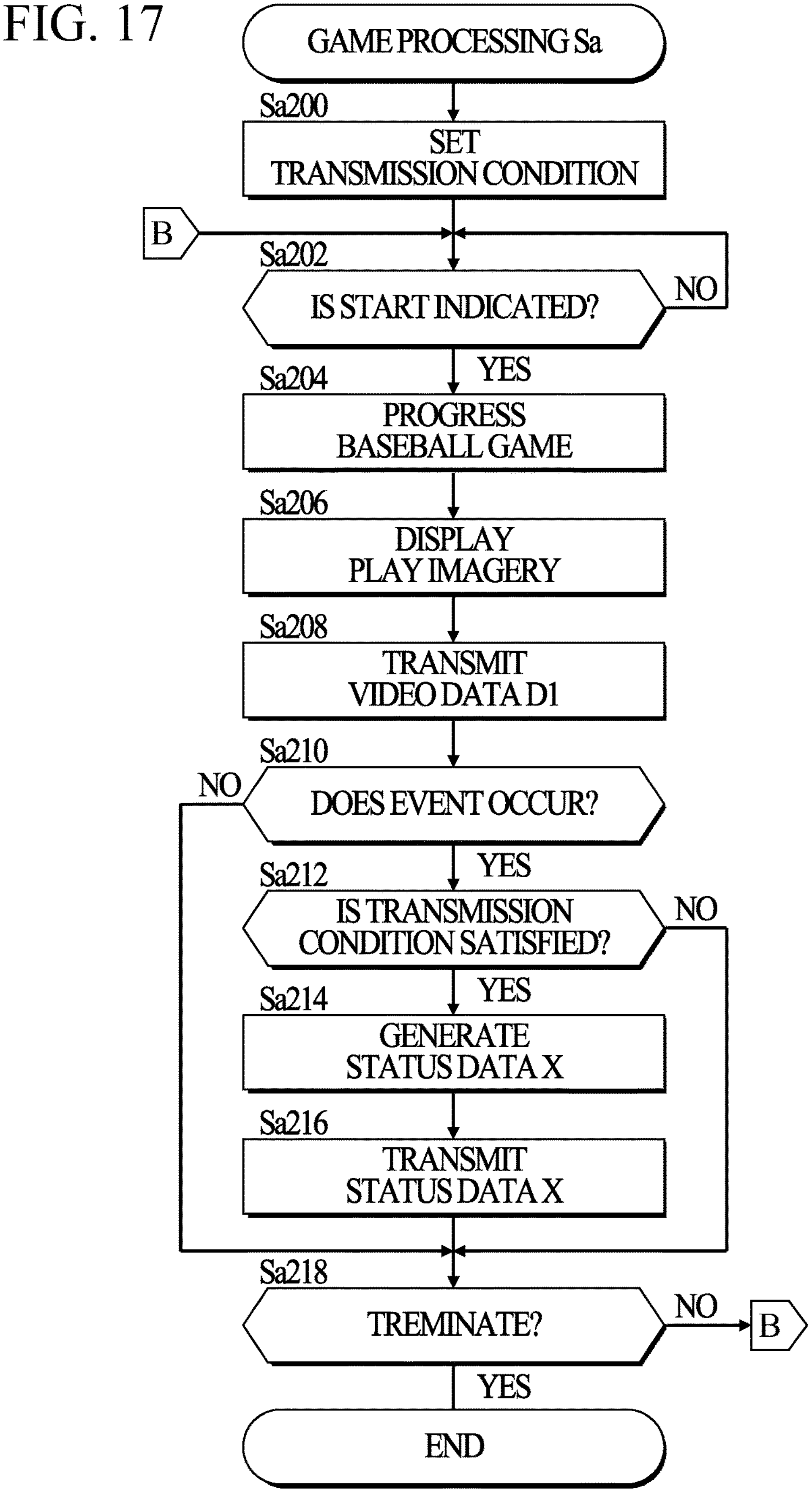
FIG. 17 is a flow chart showing a specific procedure of game processing in the third embodiment.

FIG. 17 is a flow chart showing a specific procedure of the game processing Sa according to the third embodiment. For example, the game processing Sa starts in response to an instruction from the administrator Op2 to the operation device 241.

When the game processing Sa starts, the controller 21 (condition setter 211) sets a transmission condition in accordance with an instruction from the administrator Op2 to the operation device 241 (Sa200). In response to the transmission condition being set, the controller 21 waits until the starting of the baseball game is indicated from the administrator Op2 or from a player P (Sa202: NO).

When the starting of the baseball game is indicated (Sa202: YES), the controller 21 progresses the baseball game in accordance with operations made by the respective players P that use the respective operation device 241 (Sa204), and the controller 21 causes each display 242 to display the play imagery (Sa206), as in the first embodiment. As in the first embodiment, the controller 21 transmits the video data D1 indicative of the video corresponding to the current status of the baseball game from the communication device 23 to the control system 30 (Sa208).

The controller 21 determines whether an event occurs during the progress of the baseball game (Sa210). In response to the event occurring (Sa210: YES), the controller 21 (transmission processor 212) determines whether the event satisfies the transmission condition (Sa212). Specifically, the controller 21 determines whether the event type x3 for the current event is included in the transmission condition. In response to the event satisfying the transmission condition (Sa212: YES), the controller 21 generates the status data X on the event (Sa214) to transmit the status data X from the communication device 23 to the control system 30 (Sa216).

In response to no event occurring (Sa210: NO), neither generation (Sa214) nor transmission (Sa216) of status data X is executed. In response to the event occurring (Sa210: YES) in a situation in which the event does not satisfy the transmission condition (Sa212: NO), neither generation (Sa214) nor transmission (Sa216) of status data X is executed. As will be understood from the above description, when an event satisfying the transmission condition occurs in the baseball game, the transmission processor 212 transmits the status data X of the event to the control system 30.

The controller 21 determines whether the baseball game terminates (Sa218). In response to the baseball game not terminating (Sa218: NO), the controller 21 returns the processing to step Sa202. On the other hand, in response to the baseball game terminating (Sa218: YES), the controller 21 terminates the game processing Sa. As shown above, in the third embodiment, the video data D1 is transmitted sequentially at predetermined time intervals, while the status data X satisfying the transmission condition is transmitted every time an event occurs.

In the third embodiment, the same effects as in the first embodiment are provided. In the third embodiment, when the event that occurs in the baseball game satisfies the transmission condition, the status data X of the event is transmitted to the control system 30. Thus, it is possible to generate the commentary text C only when an appropriate event occurs which satisfies the transmission condition. In addition, it is possible to reduce the amount of communication between the game system 20 and the control system 30 compared to a configuration in which the status data X is transmitted for all of the events that occurs in the baseball game. The configuration of the second embodiment, which uses the first reference data Ra and the second reference data Rb C to generate the commentary text C, may be applied to the third embodiment.

Fourth Embodiment

In the first embodiment, the configuration is shown in which all of the pieces of commentary text C generated by the information generator 312 of the control system 30 is displayed on the display 151 of the terminal apparatus 10. In a fourth embodiment, a piece of commentary text C satisfying a specific condition (hereinafter, referred to as a "play condition") among the plurality of pieces of commentary text C generated by the information generator 312 is selectively displayed on the display 151.

Figure 18:
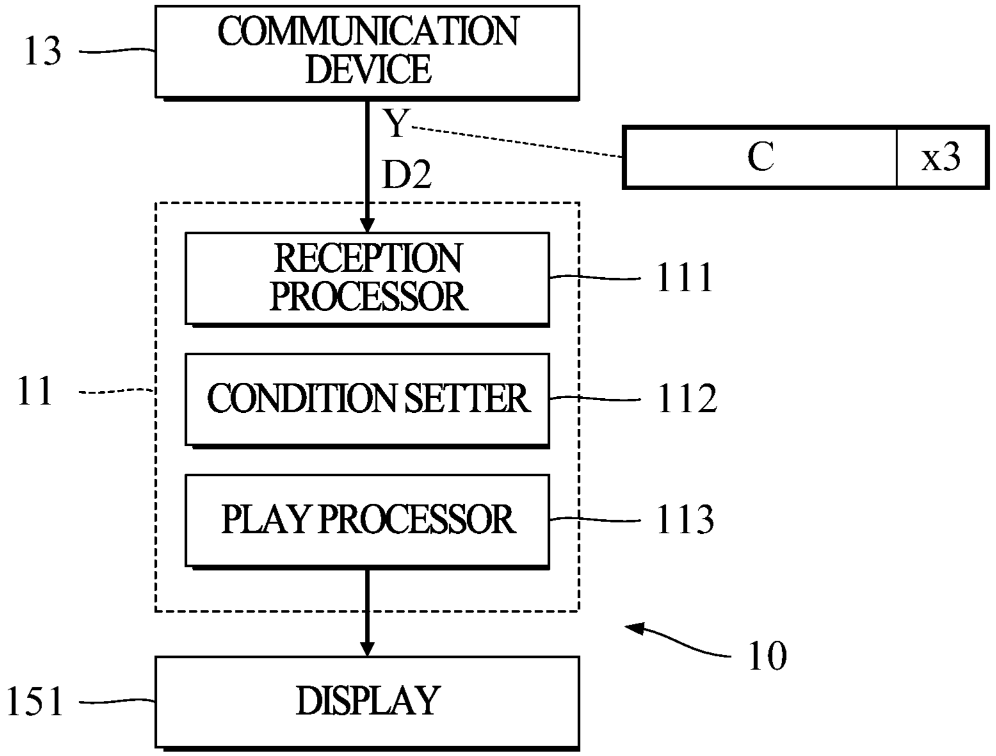
FIG. 18 is a block diagram showing a functional configuration of a terminal apparatus in a fourth embodiment.

FIG. 18 is a block diagram showing a functional configuration of the terminal apparatus 10 in the fourth embodiment. As shown in FIG. 18, the controller 11 of the terminal apparatus 10 executes the program stored in the storage device 12 to implement a plurality of functions (a reception processor 111, a condition setter 112, and a play processor 113). The condition setter 112 is an example of a second condition setter.

The reception processor 111 receives the commentary data Y and the video data D2, which are transmitted from the distribution system 40, through the communication device 13. In other words, the reception processor 111 is an element configured to receive the commentary text C, which is generated by the information generator 312, from the control system 30. As shown in FIG. 18, the commentary data Y in the fourth embodiment includes not only the commentary text C generated by the information generator 312, but also the event type x3 of an event indicated by the commentary text C. The event type x3 included in the commentary data Y of each event is information included in the status data X of the event.

The condition setter 112 sets the play condition. The play condition is a condition for an event in which a piece of commentary text C should be played. For example, one or more event type x3 are set as the play condition. The condition setter 112 sets the play condition in accordance with an instruction from the user U to the operation device 14. In response to the user U indicating an instruction indicative of one or more desired event types x3, the condition setter 112 sets a play condition that includes the one or more event types x3 indicated by the user U.

Similar to the setting of the transmission condition by the condition setter 211, a plurality of event types x3 may be collectively set as a play condition. For example, in a configuration in which a plurality of event types x3 are classified into plural sets, the condition setter 211 collectively sets one or more event types x3 belonging to a set selected by the user U as a play condition.

The play processor 113 causes the play device 15 to play the distributed video V. The play processor 113 causes the display 151 to display the game video G, which is indicated by the video data D2, and the commentary text C, which is indicated by the commentary data Y. Specifically, the play processor 113 causes the display 151 to display a piece of commentary text C in conjunction with the game video G, the piece of commentary text C satisfying the play condition set by the condition setter 112 among the plurality of pieces of commentary text C received sequentially by the reception processor 111.

Figure 19:
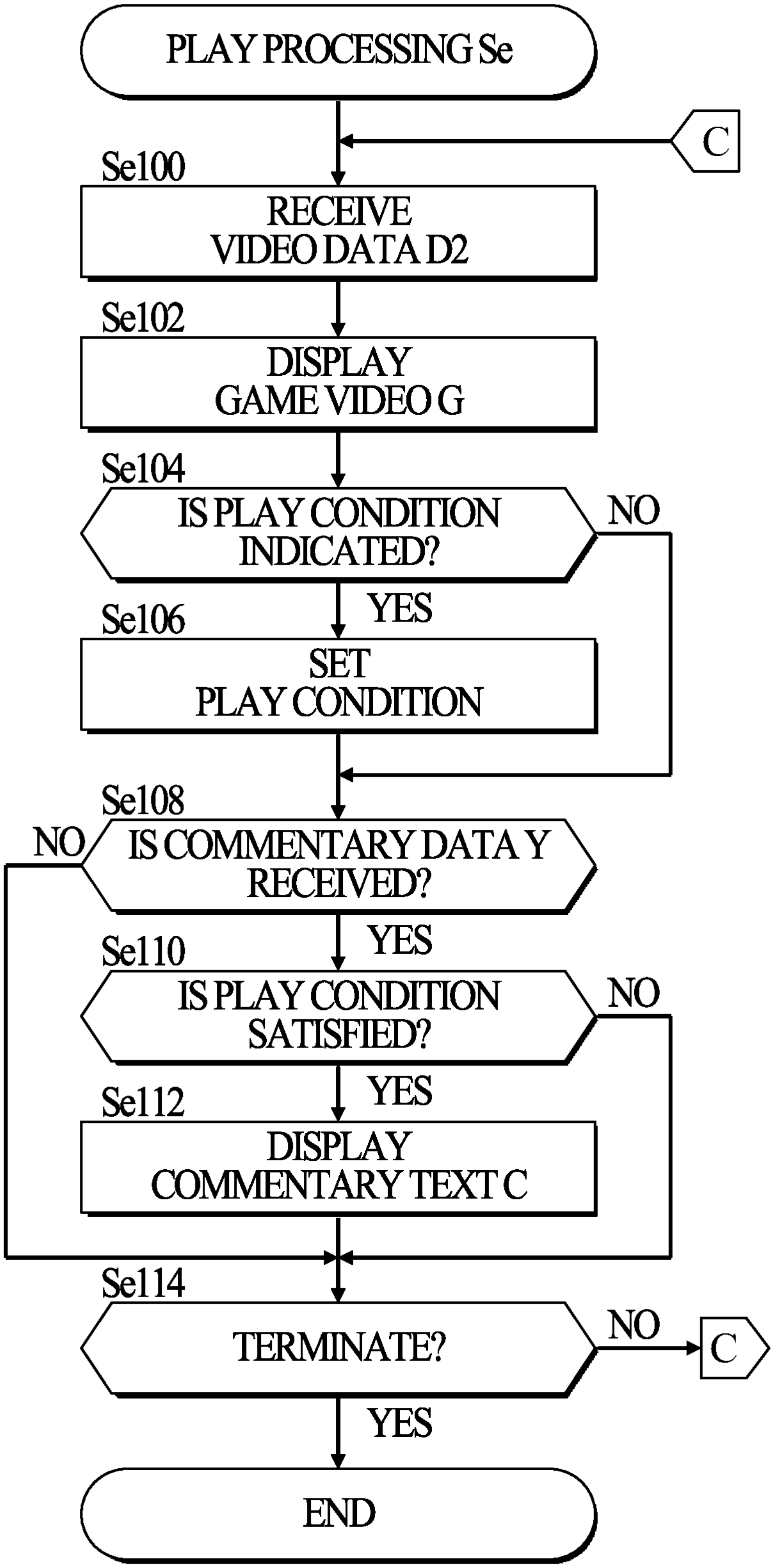
FIG. 19 is a flow chart showing a specific procedure of play processing in the fourth embodiment.

FIG. 19 is a flow chart showing a specific procedure of processing (hereinafter referred to as "play processing") Se executed by the controller 11 of the terminal apparatus 10 in the fourth embodiment. For example, the play processing Se starts in response to an instruction from the user U to the operation device 14. In an initial state immediately after the play processing Se starts, all of the event types x3 (i.e., unconditional) is specified as a play condition.

When the play processing Se starts, the reception processor 111 receives the video data D2 transmitted from the distribution system 40 (Se100). The play processor 113 causes the display 151 to display the game video G indicated by the video data D2 (Se102).

The condition setter 112 determines whether an instruction of the play condition is received from the user U (Se104). In response to the instruction of the play condition being received (Se104: YES), the condition setter 112 sets the play condition in accordance with the instruction from the user U (Se106). On the other hand, in response to the instruction of the play condition not being received (Se104: NO), the setting of the play condition (Se106) is not executed.

The play processor 113 determines whether the reception processor 111 receives the commentary data Y (Se108). In response to the reception processor 111 receiving the commentary data Y (Se108: YES), the play processor 113 determines whether the commentary text C indicated by the commentary data Y satisfies the play condition (Se110). Specifically, the play processor 113 determines whether the event type x3 included in the commentary data Y is included in the play condition. In response to the commentary text C satisfying the play condition (Se110: YES), the play processor 113 causes the display 151 to display the commentary text C indicated by the commentary data Y (Se112). Specifically, the play processor 113 displays the commentary text C received by the reception processor 111 in the commentary area Va of the distributed video V additionally.

In response to the reception processor 111 not receiving the commentary data Y (Se108: NO), neither determination of the play condition (Se110) nor display of the commentary text C (Se112) is executed. In response to the reception processor 111 receiving the commentary data Y (Se108: YES) in a situation in which the commentary text C does not satisfy the play condition (Se110: NO), the display of the commentary text C (Se112) is not executed. In other words, the commentary data Y received by the reception processor 111 is discarded.

The controller 11 determines whether a predetermined termination condition is satisfied (Se114). The termination condition is, for example, an instruction of termination from the user U to the operation device 14, or alternatively, receiving no video data D2 over a predetermined period of time (i.e., termination of the distribution of the video). In response to the termination condition not being satisfied (Se114: NO), the controller 11 returns the processing to step Se100. On the other hand, in response to the termination condition being satisfied (Se114: YES), the controller 11 terminates the play processing Se.

In the fourth embodiment, the same effects as in the first embodiment are provided. In the fourth embodiment, the display 151 of the terminal apparatus 10 displays a piece of commentary text C, which satisfies the play condition, among the plurality of pieces of commentary text C generated by the information generator 312. Accordingly, it is possible to selectively play commentary text C desired by the user U. The configuration of the second embodiment, which uses the first reference data Ra and the second reference data Rb to generate the commentary text C, and the configuration of the third embodiment, which selectively transmits only the status data X of the event satisfying the transmission condition to the control system 30, may be applied to the fourth embodiment.

Fifth Embodiment

As in the fourth embodiment, the commentary data Y in a fifth embodiment includes the commentary text C generated by the information generator 312 and the event type x3 of the event represented by the commentary text C.

Figure 20:
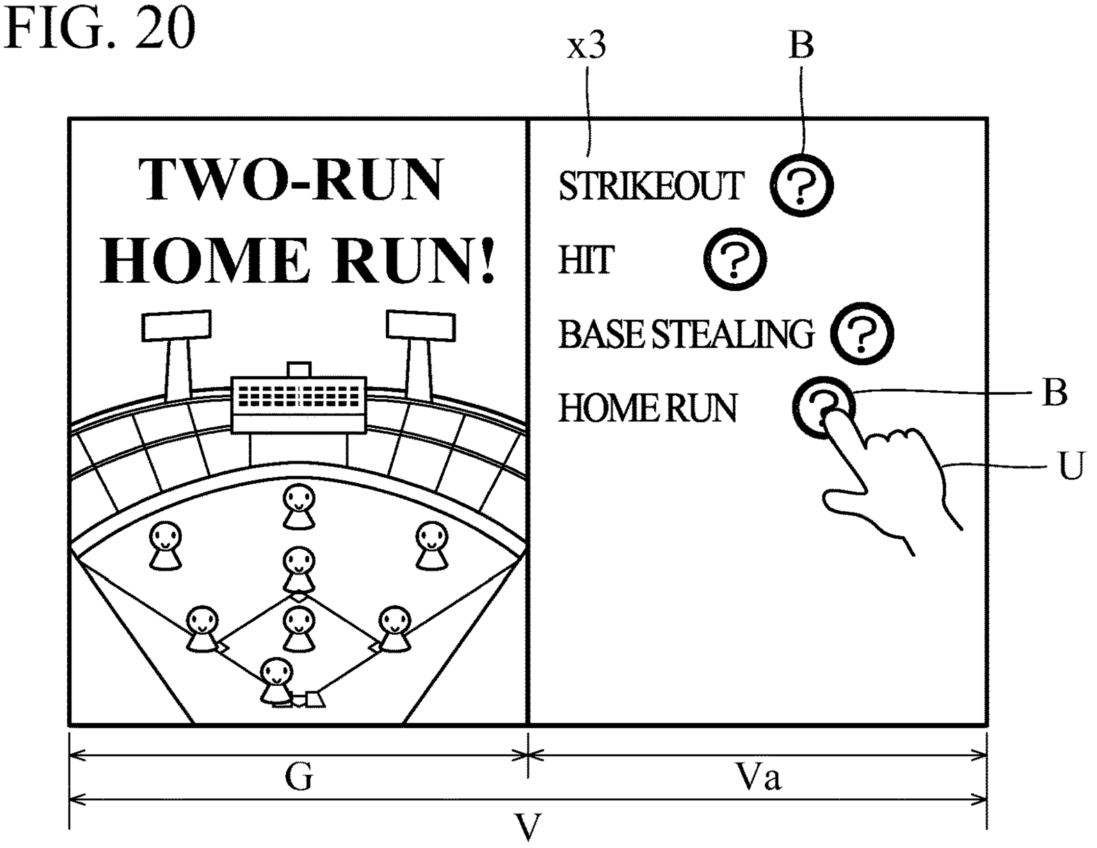
FIG. 20 is a schematic diagram of a distributed video in a fifth embodiment.

FIG. 20 is a schematic diagram of the distributed video V in the fifth embodiment. The controller 11 in the fifth embodiment displays the event type x3, which is included in the commentary data Y received by the communication device 13, on the commentary area Va of the distributed video V. The display of the event type x3 is added for each reception of the commentary data Y by the communication device 13. In other words, plural event types x3 are displayed in chronological order. The controller 11 displays an operation image B in the commentary area Va for each event type x3. Each of the operation images B is a software button configured to receive operations performed by the user U.

Figure 21:
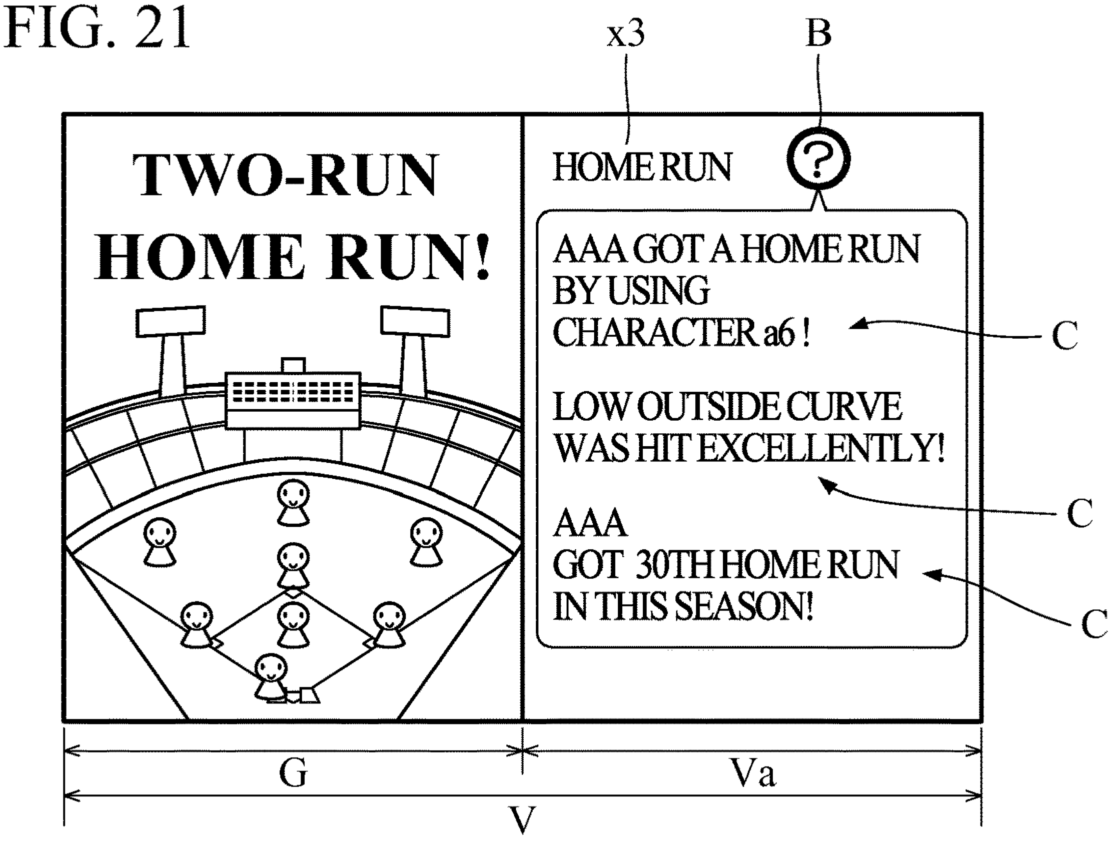
FIG. 21 is a schematic diagram of a distributed video when an operation image is operated in the fifth embodiment.

The user U can operate an operation image B, which corresponds to a desired event type x3, among the plural operation images B. In response to receipt of an operation to one of the plural operation images B, the controller 11 displays the commentary text C corresponding to the operation image B in the vicinity of the operation image B. For example, in response to the user U operating the operation image B "home run" in FIG. 20, the commentary text C for "home run" received by the communication device 13 is displayed as shown in FIG. 21. In other words, the display of a summary using the event type x3 is changed into a detailed display using the commentary text C in response to an operation by the user U. The processing described above is executed for each of the plural operation images B.

In the fifth embodiment, the same effects as in the first embodiment are provided. In the fifth embodiment, from among the plurality of pieces of commentary text C generated by the information generator 312, a piece of commentary text C selected by the user U is selectively displayed. Accordingly, compared to a configuration in which all of the pieces of commentary text C is displayed on the commentary area Va, there is an advantage in that it is easy to visually recognize commentary text C desired by the user U. Configurations of the second embodiment to the fourth embodiment may be applied to the fifth embodiment.

Modifications

Each of the embodiments described above may be variously modified. Examples of specific modifications that may be applied to the above embodiments will be described below. Two or more modifications freely selected from among the following descriptions may be combined as long as no conflict arises from such a combination.

(1) In each of the foregoing embodiments, an example of a configuration is shown in which the video data D2 and the commentary data Y are transmitted to the terminal apparatus 10; however, a configuration that causes the terminal apparatus 10 to display the commentary text C generated by the information generator 312 is not limited to the example described above. For example, the video data editor 313 may generate the distributed video V by combining the commentary text C generated by the information generator 312 with the game video G, and the video data D2 indicative of the distributed video V may be transmitted from the control system 30 to the terminal apparatus 10 via the distribution system 40. In other words, a configuration may be not required in which the commentary data Y indicative of the commentary text C is transmitted to the terminal apparatus as data that is separate from the video data D2. In the above description, the control system 30 combines the commentary text C with the game video G; however, the distribution system 40 may execute processing to combine the commentary text C with the game video G (i.e., processing to generate the distributed video V). For example, as in each of the foregoing embodiments, the control system 30 transmits the commentary data Y and the video data D2 to the distribution system 40. The distribution system 40 generates the distributed video V by combining the commentary text C with the game video G to transmit the video data D2 indicative of the distributed video V to the terminal apparatus 10. The controller 11 of the terminal apparatus 10 causes the play device 15 to play the distributed video V indicated by the video data D2.

Figure 22:
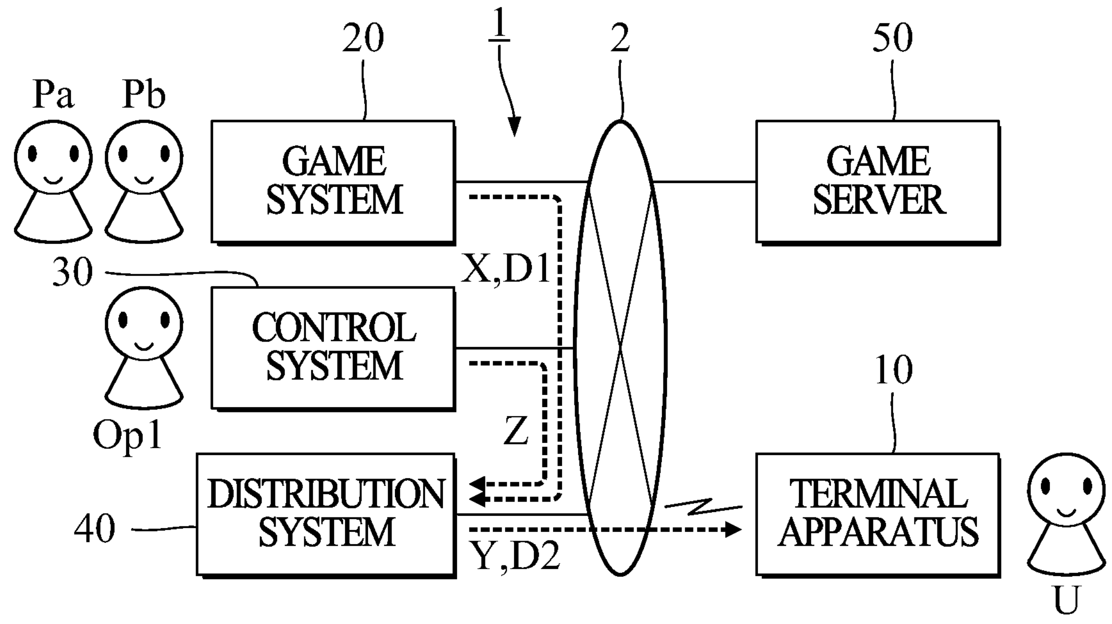
FIG. 22 is a block diagram showing a configuration of an information system according to a modification.

(2) One, some, or all of the functions of the control system 30 shown in each of the foregoing embodiments may be included in another element that constitutes the information system 1. Specifically, one, some, or all of the functions of the control system 30 may be included in the distribution system 40. For example, a configuration is assumed in which the control system 30 includes the setting data processor 314 in a situation in which the distribution system 40 includes the status data acquirer 311, the information generator 312, and the video data editor 313. In this configuration, as shown in FIG. 22, the setting data Z generated by the setting data processor 314 of the control system 30 is transferred to the distribution system 40. The distribution system 40 receives the status data X and the video data D1 transmitted by the game system 20. The status data acquirer 311 of the distribution system 40 acquires the status data X, and the information generator 312 generates the commentary data Y from the status data X and the setting data Z. The video data editor 313 of the distribution system 40 generates the video data D2 of the game video G from the video data D1. The commentary data Y and the video data D2 generated by the distribution system 40 are transmitted to the terminal apparatus 10.

Figure 23:
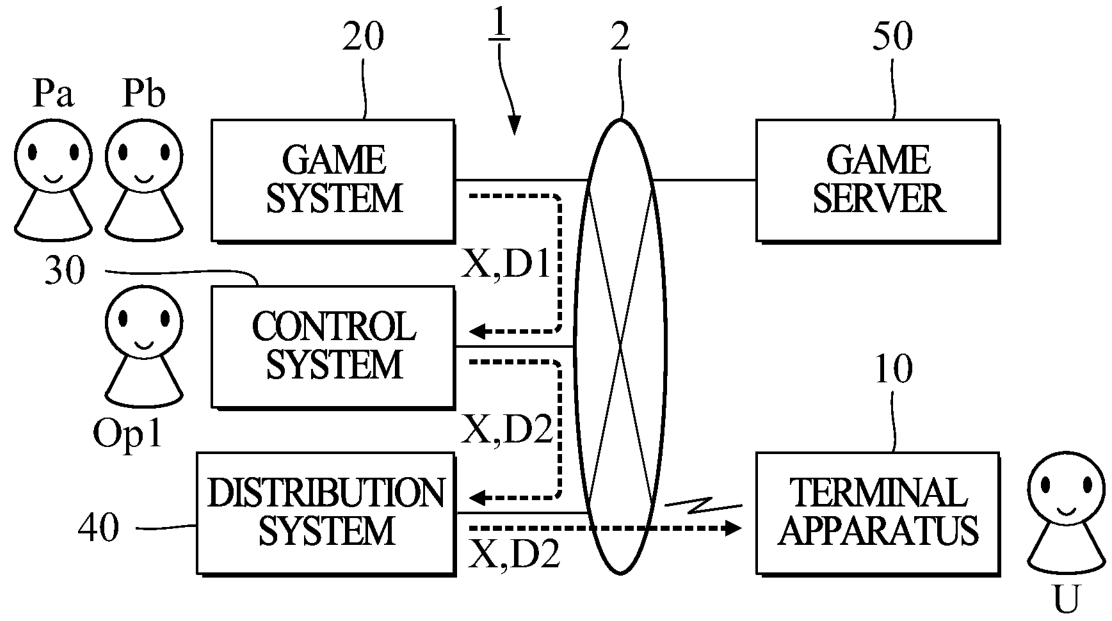
FIG. 23 is a block diagram showing a configuration of an information system according to a modification.

In addition, one, some, or all of the functions of the control system 30 shown in each of the foregoing embodiments may be included in the terminal apparatus 10. For example, a configuration is assumed in which the control system 30 includes the setting data processor 314 in a situation in which the terminal apparatus 10 includes the status data acquirer 311 and the information generator 312. The video data editor 313 is included in the control system 30 or the distribution system 40, for example. In this configuration, as shown in FIG. 23, the status data X transmitted from the game system 20 is transmitted to the terminal apparatus 10 via the control system 30 and via the distribution system 40. The status data X may be directly transmitted from the game system 20 to the terminal apparatus 10. The setting data Z generated by the setting data processor 314 of the control system 30 is transferred to the terminal apparatus 10 via the distribution system 40. The setting data Z may be directly transmitted from the control system 30 to the terminal apparatus 10. The status data acquirer 311 of the terminal apparatus 10 acquires the status data X through the communication device 13, and the information generator 312 of the terminal apparatus 10 generates the commentary data Y from the status data X and the setting data Z.

In the present disclosure, a "control system" is a computer system that includes the status data acquirer 311 and the information generator 312. Accordingly, the concept of the "control system" in the present disclosure includes not only the control system 30 shown in examples from the first embodiment to the fifth embodiment, but also the distribution system 40 in the configuration of FIG. 22 and the terminal apparatus 10 in the configuration of FIG. 23.

(3) In each of the foregoing embodiments, an example of a configuration is shown in which the commentary data Y transmitted from the control system 30 is transmitted to the terminal apparatus 10 via the distribution system 40; however, the path of the transfer of the commentary data Y is not limited to the example described above. For example, the commentary data Y may be directly transmitted from the control system 30 to the terminal apparatus 10. In addition, a configuration is assumed in which the commentary data Y generated by the control system 30 is transferred to, for example, the game server 50, and then the commentary data Y is transmitted from the game server 50 to the terminal apparatus 10. As shown above, a configuration in which the commentary data Y passes through the distribution system 40 is omitted. As in each of the foregoing embodiments, the video data D2 is transmitted from the distribution system 40 to the terminal apparatus 10.

As shown above, in a configuration in which a path, through which the commentary data Y is transmitted to the terminal apparatus 10, differs from a path, through which the video data D2 is transmitted to the terminal apparatus 10, information (hereinafter referred to as "location information") specifying the location of the video data D2 is preferably added to the commentary data Y. The location information is, for example, a uniform resource locator (URL) that specifies the location of the video data D2. According to the above configuration, the controller 11 of the terminal apparatus 10 not only acquires the commentary data Y but can also recognize the location of the video data D2. Therefore, the controller 11 can cause the play device 15 to play the commentary text C indicated by the commentary data Y and the game video G of the video data D2 indicated by the location information.

(4) In each of the foregoing embodiments, an example of a configuration is shown in which the distribution system 40 transmits the video data D2 to the terminal apparatus 10; however, the function of transmitting the video data D2 to the terminal apparatus 10 may be included in the control system 30. In other words, the video data D2 generated by the control system 30 may be directly transmitted to the terminal apparatus 10. In the above configuration, the distribution system 40, which is separate from the control system 30, is omitted.

(5) In each of the foregoing embodiments, the commentary data Y and the video data D2 are transmitted to the terminal apparatus 10 in real-time in parallel with the progress of the baseball game; however, the commentary data Y and the video data D2 may be transmitted to the terminal apparatus 10 after the termination of the baseball game.

For example, a configuration is assumed in which the commentary data Y and the video data D2 are generated after the termination of the baseball game. Specifically, the status data X and the video data D1 generated sequentially with the progress of the baseball game, and the setting data Z set in accordance with an instruction from the administrator Op1 are stored in the storage device 32 of the control system 30. After the termination of the baseball game, the information generator 312 uses the stored status data X and the stored setting data Z to generate the commentary data Y, and the video data editor 313 generates the video data D2 from the stored video data D1. The commentary data Y and the video data D2 are transmitted to the terminal apparatus 10 as in each of the foregoing embodiments. The status data X, the video data D1, and the setting data Z may be stored in the distribution system 40 or in the game server 50.

The commentary data Y generated by the information generator 312 and the video data D2 generated by the video data editor 313 may be stored in the storage device 32 of the control system 30, and the commentary data Y and the video data D2 may be transmitted to the terminal apparatus 10 after the end of the baseball game. In the above configuration, the commentary data Y corresponding to an event preferably includes the occurrence time x2 of the event in addition to the commentary text C. The occurrence time x2, which is information included in the status data X as shown in FIG. 5, is used to control the time at which the commentary text C is displayed. In other words, the controller 11 of the terminal apparatus 10 causes the display 151 to display the commentary text C, which is indicated by the commentary data Y, at the occurrence time x2 indicated by the commentary data Y in a period of time during which the game video G indicated by the video data D2 is played. According to the above configuration, even in a configuration in which the commentary data Y is separately provided from the video data D2, it is possible to play the commentary text C at an appropriate time for the game video G.

(6) In the third embodiment, an example of a configuration is shown in which the event type x3 is specified as the transmission condition; however, the contents of the transmission condition are not limited to the example described above. For example, the target player x4 or the target character x5 included in the status data X may be specified as the transmission condition. In a configuration in which the transmission condition includes the target player x4, only the status data X for the event caused by the target player x4 is transmitted from the game system 20. In a configuration in which the transmission condition includes the target character x5, the status data X is transmitted from the game system 20 only for the event in which the target character x5 is involved.

Similarly, in the fourth embodiment, an example of a configuration is shown in which the event type x3 is specified as the play condition; however, the contents of the play condition are not limited to the example described above. For example, the target player x4 or the target character x5 may be set as the play condition. In a configuration in which the play condition includes the target player x4, only the commentary text C for the event caused by the target player x4 is selectively displayed on the display 151. In a configuration in which the play condition includes the target character x5, only the commentary text C for the event in which the target character x5 is involved is selectively displayed on the display 151.

(7) In the third embodiment, the transmission condition is set in accordance with an instruction from the administrator Op2; however, a matter used to set the transmission condition is not limited to the example described above. For example, the transmission condition may be set in accordance with a rating (final/semifinal) of a match between the player Pa and the player Pb. For example, a configuration is assumed in which the transmission condition in a final is set less stringently than the transmission condition in a semifinal. In the above embodiment, commentary text C is more frequently provided to the terminal apparatus 10 in the final than in the semifinal. The transmission condition may be set in accordance with the total number of users U that are to view the distributed video V. For example, a configuration is assumed in which the transmission condition becomes relaxed as the total number of users U increases. In the above embodiment, the greater the total number of users U, the more frequently the commentary text C is provided to the terminal apparatus 10. As will be understood from the above description, an instruction from the administrator Op2 may be not required to set the transmission condition.

(8) In each of the foregoing embodiments, an example of the baseball game is shown in which the plurality of players P play against each other in a baseball; however, the type of game in the present disclosure may be freely selected. The event type x3 shown in each of the foregoing embodiments may be variously set in accordance with the type of game.

For example, each of the foregoing embodiments may be applied to a competitive game in which a plurality of players P play against each other in a sport other than baseball. For example, in a soccer game, an event types x3 such as “shoot,” “goal kick,” “off-side,” and “goal” is assumed. In a fighting game, various event types x3 such as “an occurrence of a particular killer move,” “an occurrence of N or more successive combos,” “knockout,” “down,” and “used character change” are assumed. The present disclosure may be applied not only to a game in which a plurality of players P plays against each other, but also to a game in which a plurality of players P cooperates with each other to achieve an aim (for example, defeat of a boss-character). The present disclosure may be applied not only to a game played by a plurality of players P, but also to a game played by a single player P. For example, the present disclosure may be applied to a search game in which a single player P searches a virtual world. The present disclosure may be applied not only to the games described above, but also to various types of games, regardless of the number of players P, or regardless of the relationship between players P, such as a lottery game in which lottery processing such as a physical lottery or an electronic lottery is executed, a music game in which a player P operates in accordance with music, an action game in which a player P achieves various aims by operating a character for the player P.

(9) In each of the foregoing embodiments, an example of the supplementary data Q including the player name q1 and the total record q2 is shown; however, specific contents of the supplementary data Q are not limited to the example described above. For example, a rating (final/semifinal) of a match between the player Pa and the player Pb may be registered as the supplementary data Q. According to the above configuration, it is possible to generate commentary text C in accordance with a result of the match between the player Pa and the player Pb. For example, when the match is terminated in a situation in which “semifinal” is registered as the supplementary data Q, commentary text C such as “AAA goes to final!” can be generated. Alternatively, for example, when a competition event is assumed in which a plurality of players P plays against each other in a race game (for example, a time attack in which each player P competes with the others in running time), a configuration is preferable in which running time of each player P is registered as the supplementary data Q. According to the above configuration, it is possible to generate commentary text C such as “This running time is second in this competition!” immediately after the finish of a player P.

(10) In each of the foregoing embodiments, an example of the commentary text C constituted by text is shown; however, information (hereinafter referred to as “commentary information”) indicative of a commentary on the status of the game is not limited to the commentary text C. For example, imagery indicative of the commentary on the status of the game may be displayed on the display 151 of the terminal apparatus 10 as the commentary information. In a configuration in which the commentary information is imagery, imagery data indicative of imagery for commentary, instead of the registered text r1 in the foregoing embodiments, is registered in the reference data R, for example. Alternatively, an audio sound indicative of the commentary on the status of the game may be emitted from the sound emitting device 152 of the terminal apparatus 10 as the commentary information. In a configuration in which the commentary information is an audio sound, audio sound data indicative of an audio sound for commentary, instead of the registered text r1 in the foregoing embodiments, is registered in the reference data R, for example. The audio sound data indicative of an audio sound for commentary may be generated by executing voice synthesis processing on the commentary text C generated in the same manner as in each of the foregoing embodiments. As will be understood from the above examples, the registered text r1 shown in each of the foregoing embodiments, the imagery for commentary, and the audio sound for commentary are comprehensively included in “registration information” used to generate the commentary information. In addition, “play” of the commentary information includes, for example, both emitting the audio sound for commentary and the display of the commentary text C or of the imagery for commentary.

(11) The functions of the control system 30 according to each of the foregoing embodiments are implemented by a combination of one or more processors (controller 31) and a program. The program according to each of the foregoing embodiments may be provided in a form stored in a computer-readable recording medium and may be installed in a computer. The recording medium is, for example, a non-transitory recording medium, and although an optical recording medium (an optical disk) such as a compact disk read-only memory (CD-ROM) is one example of the recording medium, the recording medium may also include a recording medium of any known form, such as a semiconductor recording medium or a magnetic recording medium. The non-transitory recording medium, which includes any recording medium except for a transitory, propagating signal, does not exclude a volatile recording medium. The non-transitory recording medium may be a storage apparatus in a distribution apparatus that stores a computer program for distribution via a communication network 2.

Supplemental Notes

For example, the present disclosure is understood as follows based on the above descriptions. In the following descriptions, reference signs in the drawings are denoted in parentheses for convenience in order to facilitate understanding of each aspect, but the present disclosure is not limited to the aspects illustrated in the drawings.

Supplemental Note 1

A control system (30) according to one aspect (supplemental note 1) of the present disclosure includes: a status data acquirer (311) configured to acquire status data (X) indicative of a status of a game from a game system (20) configured to progress the game played by one or more players (P); and an information generator (312) configured to generate commentary information (C) to be played by a terminal apparatus (10) to which a game video (G) representative of the status of the game is delivered, the commentary information (C) being to be played in conjunction with the game video (G), in which the information generator (312) is configured to use the status data (X) acquired by the status data acquirer (311) and setting data (Z) specifying a commentary condition to generate the commentary information (C) on the status of the game under the commentary condition. According to the aspect described above, by using the status data (X) indicative of the status of the game in the game system (20) and the setting data (Z) specifying the commentary condition, the commentary information (C) on the status of the game is automatically generated under the commentary condition. The commentary information (C) is played in conjunction with the game video (G) representative of the status of the game. Therefore, for example, compared to a configuration in which a provider of the game video (G) manually enters the commentary information (C) in parallel with the progress of the game, it is possible to reduce a load for generation of the commentary information (C).

The "game" is a freely selected type of video game. For example, a game played by a plurality of players may be cited. The "game played by a plurality of players" is, for example, a game in which a plurality of players plays against each other, or a game in which a plurality of players cooperates with each other to achieve an aim. For example, the "game played by a plurality of players" includes not only a game played by two players, but also a game played by three or more players, or a game played by a team of two or more players as a unit. The "game" according to the present disclosure includes a game played by a single player.

The "game system" is a freely selected computer system configured to progress the game and is constituted by one or more devices. The relationship between the game system and one or more players is freely selected. For example, a configuration in which a game system includes individual game units for respective players, or a configuration in which a plurality of players uses a game system is assumed.

The "status of the game" means the state of the game which changes with the progress of the game. For example, an occurrences of each event in the game may be cited as the "status of the game." The event that occurs in the game means each event that occurs due to the progress of the game. Specifically, an event that directly or indirectly affect the outcome of the game (for example, winning or defeat in a competition game) is a typical example of the "event." The "event" is, for example, an event in which a character executes a specific operation, an event in which a specific condition is satisfied in the game, etc. Specifically, in a baseball game, an event such as a hit that causes a score may be cited, for example. In a racing game, a change in rank among multiple objects (for example, automobiles) that compete with each other is assumed as an event.

The "commentary information" is information indicative of a commentary on the status of the game. For example, the concept of "commentary information" includes text representative of the status of the game or text representative of a matter associated with the status of the game (for example, various information on a character in which a particular event occurs). The text representative of the commentary information is constituted by, for example, one or more sentences, one or more words, or a combination thereof. The commentary information may be imagery representative of a commentary on the status of the game or an audio sound representative of a commentary on the status of the game. In other words, the commentary information includes not only text data indicative of text for commentary, but also imagery data indicative of imagery for commentary and audio sound data indicative of an audio sound for commentary, for example.

The "setting data" is data, which specifies a condition (commentary condition) for the commentary information, in a freely selected format. The commentary condition includes, for example, a condition for the contents of the commentary information and a condition for generation of the commentary information. The condition for the contents of the commentary information is, for example, text for a fixed portion of the commentary information, or text for a variable portion of the commentary information. The condition for generation of the commentary information is, for example, a condition for permission to generate the commentary information or a condition for generation of the commentary information.

The "game video representative of the status of the game" is imagery for the user of the terminal apparatus to visually recognize the progress of the game. A typical example of the game video is a video similar to a video (a video that is displayed on a display of the game system and that is visually recognized by the player) displayed for one or more players; however, the game video is not limited to a video that has the same contents as the contents of the video displayed for the player. For example, a video (a video different from the video displayed for the player) captured by a virtual camera in a virtual space in which the game progresses, may be cited as the "game video." For example, when a configuration is assumed in which an image corresponding to a viewpoint of a character is displayed for a player, an image representative of a bird's-eye view of the character operated by each player may be cited as the game video. A video other than the video generated by the game system, such as a video obtained by capturing a state in which the player plays the game, may be added to the game video, for example. The format of the video data indicative of the video displayed for the player may be the same as, or may be different from, the format of the video data provided for the terminal apparatus. For example, the video data of the video displayed for the player is uncompressed data, whereas the video data provided for the terminal apparatus is compressed data.

The "play" of the commentary information means output of the commentary information in a manner that is perceptible to the user of the terminal apparatus. Specifically, processing to cause a display to display the commentary information, or processing to cause a sound emitting device to emit an audio sound representative of the commentary information may be cited as the "play." The commentary information "being played in conjunction with the game video" means that a period of time during which the game video is played and a period of time during which the commentary information is played overlap at least partially on a time axis (in other words, the game video and the commentary information are played in parallel with each other). When a configuration is assumed in which the commentary information is displayed, the relationship between the position of display of the commentary information in a display and the position of display of the game video in the display may be freely selected. For example, the commentary information, which is superimposed on the game video, may be displayed, or alternatively, the commentary information may be displayed in a first area while the game video is displayed in an area that is spaced from, or that is adjacent to, the first area.

Supplemental Note 2

In a specific example (supplemental note 2) of the supplemental note 1, the setting data (Z) includes supplementary information (Q) not used in the game system (20), and the commentary information (C) includes the supplementary information (Q). According to the aspect described above, the commentary information (C) that includes the supplementary information (Q) not used in the game system (20) is generated; accordingly, compared to a configuration that generates the commentary information (C) from only the status data (X), it is possible to provide the user (U) of the terminal apparatus (10) with the commentary information (C) having rich contents.

The "supplemental information" is freely selected information that is not processed (for example, generated) in the game system. For example, when a configuration is assumed in which only information on each game is generated in the game system (a configuration in which information on the game is initialized for each game), information that is aggregated over a plurality of times of games is included in the commentary information as "supplementary information." For example, when a configuration is assumed in which the game system provides a baseball game in which the number of home runs or the number of strikeouts (the number of grabbing strikeouts) is initialized for each game, the total home runs and the total strikeouts (the total number of grabbing strikeouts) over a plurality of times of games are included in the commentary information as "supplementary information." When a configuration is assumed in which each player is identified by a name in the game such as "Player 1" or "Player 2," the name of each player is included in the commentary information as "supplementary information."

Supplemental Note 3

In a specific example (supplemental note 3) of the supplemental note 1 or 2, the status data (X) indicates an event occurring in the game, the setting data (Z) includes a plurality of pieces of registration information (r1) corresponding to different events in the game, and the commentary information (C) includes a piece of registration information (r1) corresponding to the event indicated by the status data (X) among the plurality of pieces of registration information (r1). In the aspect described above, the terminal apparatus (10) plays the commentary information (C) that includes the piece of registration information (r1) corresponding to the event that occurs in the game among the plurality pieces of registration information (r1). Accordingly, the user (U) of the terminal apparatus (10) can easily understand events that occur in the game.

The "registration information" is information constituting part or all of the commentary information and is indicated by text, for example. The "registration information" may be text (in other words, a sentence or a word) that is semantically effective alone or may be part of particular text. Regarding the registration information that is effective alone, only the registration information may be used as the commentary information, or alternatively, the registration information may constitute the commentary information together with other information such as the supplemental information. The registration information that is part of particular text is, for example, a fixed portion that is shared in different pieces of commentary information. In other words, for example, by adding other information such as supplementary information to the registration information, the commentary information that is semantically effective is constituted. Similarly to the commentary information described above, the registration information may be imagery or an audio sound. In other words, the "registration information" includes not only text for commentary, but also imagery for commentary and an audio sound for commentary.

Supplemental Note 4

In a specific example (supplemental note 4) of the supplemental note 3, the setting data (Z) includes, for one or more pieces of registration information (r1) among the plurality of pieces of registration information (r1), condition data (r3) indicative of a generation condition for the commentary information (C) including the piece of registration information (r1), and the information generator (312) is configured to generate the commentary information (C) including the piece of registration information (r1) corresponding to the event in response to the generation condition indicated by the condition data (r3) that corresponds to the piece of registration information (r1) being satisfied. In the aspect described above, the commentary information (C) including the piece of registration information (r1) corresponding to the event is generated in response to the generation condition that corresponds to the piece of registration information (r1) being satisfied. In other words, regarding a predetermined registration information (r1), the commentary information (C) is not generated when only an event corresponding to the registration information (r1) occurs, but the commentary information (C) is generated when the generation condition is further generated. Accordingly, it is possible to generate the commentary information (C) including the predetermined registration information (r1) only in predetermined circumstances.

The "generation condition" is a freely selected condition other than an occurrence of an event. For example, a condition on a numerical value indicated by the supplementary information may be cited as "generation condition." For example, each condition such as a numerical value indicated by the supplementary information being greater than a predetermined threshold, the numerical value being less than a predetermined threshold, or the numerical value corresponding to a multiple of a predetermined value, may be cited as "generation conditions."

Supplemental Note 5

In a specific example (supplemental note 5) of any one of the supplemental notes 1 to 4, the setting data (Z) includes, for each of the one or more players (P), permission data (r2) for each piece of registration information (r1) among a plurality of pieces of registration information (r1) corresponding to different events in the game, the permission data (r2) indicating whether to permit generation of commentary information (C) including a corresponding piece of registration information (r1), and the information generator (312) is configured: when permission data (r2) corresponding to a piece of registration information (r1) among the plurality of pieces of registration information (r1) indicates permission, to generate the commentary information (C) including the piece of registration information (r1); and when the permission data (r2) indicates no permission, not to generate the commentary information (C) including the piece of registration information (r1). In the aspect described above, permission or no permission of generation of the commentary information (C) including a registration information (r1) is set for each player (P). Accordingly, it is possible to provide the user (U) of the terminal apparatus (10) with the commentary information (C) having suitable contents for each player (P).

Supplemental Note 6

In a specific example (supplemental note 6) of any one of the supplemental notes 1 to 4, the one or more players (P) comprise a plurality of players (P) including a first player (Pa) and a second player (Pb), the setting data (Z) includes: first reference data (Ra) in which a plurality of pieces of registration information (r1) corresponding to the first player (Pa) is registered; and second reference data (Rb) in which a plurality of pieces of registration information (r1) corresponding to the second player (Pb) is registered, and the information generator (312) is configured to: generate, for the first player (Pa), the commentary information (C) including one of the plurality of pieces of registration information (r1) registered in the first reference data (Ra); and generate, for the second player (Pb), the commentary information (C) including one of the plurality of pieces of registration information (r1) registered in the second reference data (Rb). In the aspect described above, the commentary information (C) on the first player (Pa) includes the registration information (r1) of the first reference data (Ra), and the commentary information (C) on the second player (Pb) includes the registration information (r1) of the second reference data (Rb). Accordingly, it is possible to provide the user (U) of the terminal apparatus (10) with the commentary information (C) having suitable content for each player (P).

A plurality of pieces of registration information is separately registered for each of the first reference data and the second reference data. Accordingly, a plurality of pieces of registration information of the first reference data may differ from a plurality of pieces of registration information of the second reference data in contents or in combination. A configuration is assumed in which all of the plurality of pieces of registration information of the first reference data differs from all of the plurality of pieces of registration information of the second reference data, or alternatively, a configuration is assumed in which the plurality of pieces of registration information of the first reference data and the plurality of pieces of registration information of the second reference data partially overlap.

Supplemental Note 7

An information system (1) according to one aspect (supplemental note 7) of the present disclosure includes: a game system (20) configured to progress a game played by one or more players (P); and a control system (30) configured to communicate with the game system (20), in which the control system (30) includes: a status data acquirer (311) configured to acquire status data (X) indicative of a status of the game from the game system (20); and an information generator (312) configured to generate commentary information (C) to be played by a terminal apparatus (10) to which a game video (G) representative of the status of the game is delivered, the commentary information (C) being to be played in conjunction with the game video (G), and the information generator (312) is configured to use the status data (X) acquired by the status data acquirer (311) and setting data (Z) specifying a commentary condition to generate the commentary information (C) on the status of the game under the commentary condition.

Supplemental Note 8

In a specific example (supplemental note 8) of the supplemental note 7, the game system (20) includes: a first condition setter (211) configured to set a condition for an event that is to occur in the game; and a transmission processor (212) configured to, in response to an occurrence of an event in the game, transmit status data (X) indicative of the event to the control system (30), the event satisfying the condition set by the first condition setter (211). In the aspect described above, when an event that occurs in the game satisfies a transmission condition, the status data (X) of the event is transmitted to the control system (30). Accordingly, it is possible to generate the commentary information (C) only when an appropriate event occurs which satisfies the transmission condition. In addition, it is possible to reduce the amount of communication between the game system (20) and the control system (30) compared to a configuration in which the status data (X) is transmitted for all of the events that occurs in the game.

The "condition for an event" is, for example, a condition for the type of event, or a condition for information on the event. For example, when a baseball game is assumed, a restriction of the type of event, such as an occurrence of a home run or an occurrence of a strikeout, corresponds to the "condition for the type of event." A condition for a character that causes a particular event or detailed information on the event (for example, the type of pitch performed by a pitcher) corresponds to the "condition for information on the event."

Supplemental Note 9

In a specific example (supplemental note 9) of the supplemental note 7 or 8, the terminal apparatus (10) includes: a reception processor (111) configured to receive the commentary information (C) from the control system (30); a play processor (113) configured to play the game video (G); and a second condition setter (112) configured to set a play condition in accordance with an instruction from a user (U) of the terminal apparatus (10), and the play processor (113) is configured to play a piece of commentary information (C) satisfying the play condition set by the second condition setter (112) among a plurality of pieces of commentary information (C) in conjunction with the game video (G), the plurality of pieces of commentary information (C) being received sequentially by the reception processor (111). In the aspect described above, a piece of commentary information (C), which satisfies the play condition, among the plurality of pieces of commentary information (C) received sequentially by the reception processor (111) is played. Accordingly, it is possible to selectively play commentary information (C) desired by the user (U) of the terminal apparatus (10).

The "play condition" is a condition on play of the commentary information (C). Specifically, the play condition is, for example, a condition for the type of event indicated by the commentary information or a condition for information on the event. For example, when a baseball game is assumed, a restriction of the type of event, such as an occurrence of a home run or an occurrence of a strikeout, corresponds to the "condition for the type of event indicated by the commentary information." A condition for a character that causes a particular event or detailed information on the event (for example, the type of pitch performed by a pitcher) corresponds to the "condition for information on the event indicated by the commentary information."

An information processing method (Sc) according to one aspect (supplemental note 10) of the present disclosure includes: acquiring status data (X) indicative of a status of a game from a game system (20) configured to progress the game played by one or more players (P); and generating commentary information (C) to be played by a terminal apparatus (10) to which a game video (G) representative of the status of the game is delivered, the commentary information (C) being to be played in conjunction with the game video (G), in which the generating of the commentary information (C) includes using the status data (X) and setting data (Z) specifying a commentary condition to generate the commentary information (C) on the status of the game under the commentary condition.

Supplemental Note 11

A program according to one aspect (supplemental note 11) of the present disclosure causes a computer system to function as: a status data acquirer (311) configured to acquire status data (X) indicative of a status of a game from a game system (20) configured to progress the game played by one or more players (P); and an information generator (312) configured to generate commentary information (C) to be played by a terminal apparatus (10) to which a game video (G) representative of the status of the game is delivered, the commentary information (C) being to be played in conjunction with the game video (G), in which the information generator (312) is configured to use the status data (X) acquired by the status data acquirer (311) and setting data (Z) specifying a commentary condition to generate the commentary information (C) on the status of the game under the commentary condition.

DESCRIPTION OF REFERENCE SIGNS

1 . . . information system, 2 . . . communication network, 10 . . . terminal apparatus, 11 . . . controller, 111 . . . reception processor, 112 . . . condition setter, 113 . . . play processor, 12 . . . storage device, 13 . . . communication device, 14 . . . operation device, 15 . . . play device, 151 . . . display, 152 . . . sound emitting device, 20 . . . game system, 21 . . . controller, 211 . . . condition setter, 212 . . . transmission processor, 22 . . . storage device, 23 . . . communication device, 24 (24*a*, 24*b*) . . . game unit, 241 . . . operation device, 242 . . . display, . . . control system, 31 . . . controller, 311 . . . status data acquirer, 312 . . . information generator, 313 . . . video data editor, 314 . . . setting data processor, 32 . . . storage device, 33 . . . communication device, 34 . . . operation device, 35 . . . display, 40 . . . distribution system, 50 . . . game server.

What is claimed is:

1. A control system comprising:
one or more memories configured to store instructions; and
one or more processors communicatively connected to the one or more memories and configured to execute the instructions to:
acquire status data indicative of a status of a game from a game system configured to progress the game played by one or more players;
generate commentary information to be played by a terminal apparatus to which a game video representative of the status of the game is delivered, the commentary information to be played in conjunction with the game video; and
use the status data and setting data specifying a commentary condition to generate the commentary information on the status of the game under the commentary condition,
wherein the setting data includes, for each of the one or more players, permission data for each piece of registration information among a plurality of pieces of registration information corresponding to different events in the game, the permission data indicating whether to permit generation of commentary information including a corresponding piece of registration information.

2. The control system according to claim 1, wherein:
the setting data further includes supplementary information not used in the game system, and
the commentary information includes the supplementary information.

3. The control system according to claim 1, wherein:
the status data indicates an event occurring in the game,
the setting data further includes a plurality of pieces of registration information corresponding to different events in the game, and
the commentary information includes a piece of registration information corresponding to the event indicated by the status data among the plurality of pieces of registration information.

4. The control system according to claim 3, wherein:
the setting data further includes, for one or more pieces of registration information among the plurality of pieces of registration information, condition data indicative of a generation condition for the commentary information including the piece of registration information, and
the one or more processors are configured to execute the instructions to generate the commentary information including the piece of registration information corresponding to the event in response to the generation condition indicated by the condition data that corresponds to the piece of registration information being satisfied.

5. The control system according to claim 1, wherein
the one or more processors are configured to execute the instructions:
when permission data corresponding to a piece of registration information among the plurality of pieces of registration information indicates permission, to generate the commentary information including the piece of registration information; and
when the permission data indicates no permission, not to generate the commentary information including the piece of registration information.

6. The control system according to claim 1, wherein:
the one or more players comprise a plurality of players including a first player and a second player,
the setting data further includes:
first reference data in which a plurality of pieces of registration information corresponding to the first player is registered; and
second reference data in which a plurality of pieces of registration information corresponding to the second player is registered, and
the one or more processors are configured to execute the instructions to:
generate, for the first player, the commentary information including one of the plurality of pieces of registration information registered in the first reference data; and
generate, for the second player, the commentary information including one of the plurality of pieces of registration information registered in the second reference data.

7. An information system comprising:
a game system configured to progress a game played by one or more players; and
a control system configured to communicate with the game system,
wherein:
the control system includes:
one or more first memories configured to store first instructions; and one or more first processors communicatively connected to the one or more first memories and configured to execute the first instructions to:

acquire status data indicative of a status of the game from the game system;

generate commentary information to be played by a terminal apparatus to which a game video representative of the status of the game is delivered, the commentary information to be played in conjunction with the game video; and use the status data and setting data specifying a commentary condition to generate the commentary information on the status of the game under the commentary condition, wherein the setting data includes, for each of the one or more players, permission data for each piece of registration information among a plurality of pieces of registration information corresponding to different events in the game, the permission data indicating whether to permit generation of commentary information including a corresponding piece of registration information.

8. The information system according to claim 7, wherein the game system includes:

one or more second memories configured to store second instructions; and one or more second processors communicatively connected to the one or more second memories and configured to execute the second instructions to:

set a condition for an event that is to occur in the game; and in response to an occurrence of an event in the game, transmit status data indicative of the event to the control system, the event satisfying the condition for the event that is to occur in the game.

9. The information system according to claim 7, wherein:

the terminal apparatus includes:

one or more third memories configured to store third instructions; and one or more third processors communicatively connected to the one or more third memories and configured to execute the third instructions to:

receive the commentary information from the control system;

set a play condition in accordance with an instruction from a user of the terminal apparatus; and play a piece of commentary information satisfying the play condition among a plurality of pieces of commentary information in conjunction with the game video, the plurality of pieces of commentary information being received sequentially by the reception processor.

10. A computer-implemented information processing method comprising:

acquiring status data indicative of a status of a game from a game system configured to progress the game played by one or more players; and generating commentary information to be played by a terminal apparatus to which a game video representative of the status of the game is delivered, the commentary information to be played in conjunction with the game video, wherein the generating of the commentary information includes using the status data and setting data specifying a commentary condition to generate the commentary information on the status of the game under the commentary condition, and wherein the setting data includes, for each of the one or more players, permission data for each piece of registration information among a plurality of pieces of registration information corresponding to different events in the game, the permission data indicating whether to permit generation of commentary information including a corresponding piece of registration information.

11. A non-transitory computer-readable recording medium storing a program executable by a computer system configured to execute the program to:

acquire status data indicative of a status of a game from a game system configured to progress the game played by one or more players;

generate commentary information to be played by a terminal apparatus to which a game video representative of the status of the game is delivered, the commentary information being to be played in conjunction with the game video; and use the status data and setting data specifying a commentary condition to generate the commentary information on the status of the game under the commentary condition, wherein the setting data includes, for each of the one or more players, permission data for each piece of registration information among a plurality of pieces of registration information corresponding to different events in the game, the permission data indicating whether to permit generation of commentary information including a corresponding piece of registration information.

* * * * *